(12) United States Patent
Zmudzinski et al.

(10) Patent No.: US 10,540,291 B2
(45) Date of Patent: Jan. 21, 2020

(54) TRACKING AND MANAGING TRANSLATION LOOKASIDE BUFFERS

(71) Applicant: Intel Corporation, Santa Clara, CA (US)

(72) Inventors: Krystof C. Zmudzinski, Forest Grove, OR (US); Carlos V. Rozas, Portland, OR (US); Francis X. McKeen, Portland, OR (US); Rebekah M. Leslie-Hurd, Portland, OR (US); Meltem Ozsoy, Hillsboro, OR (US); Somnath Chakrabarti, Portland, OR (US); Mona Vij, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/592,089

(22) Filed: May 10, 2017

(65) Prior Publication Data
US 2018/0329829 A1 Nov. 15, 2018

(51) Int. Cl.
*G06F 12/1027* (2016.01)
*G06F 12/1009* (2016.01)
(Continued)

(52) U.S. Cl.
CPC ...... *G06F 12/1027* (2013.01); *G06F 9/45558* (2013.01); *G06F 12/1009* (2013.01);
(Continued)

(58) Field of Classification Search
CPC ......... G06F 12/1009; G06F 2212/1052; G06F 2212/68; G06F 9/45558; G06F 12/1027; G06F 2009/45587
See application file for complete search history.

(56) References Cited

U.S. PATENT DOCUMENTS 5,906,001 A * 5/1999 Wu ..................... G06F 12/1036
  711/141
7,124,170 B1  10/2006 Sibert
(Continued)

OTHER PUBLICATIONS

Patricia J. Teller, "Translation-Lookaside Buffer Consistency", Jun. 1990, IEEE, Computer (vol. 23, Issue: 6), 26-36 (Year: 1990).*

*Primary Examiner* — Reginald G Bragdon
*Assistant Examiner* — Curtis James Kortman
(74) *Attorney, Agent, or Firm* — Lowenstein Sandler LLP

(57) ABSTRACT

Translation lookaside buffer (TLB) tracking and managing technologies are described. A processing device comprises a translation lookaside buffer (TLB) and a processing core to execute a virtual machine monitor (VMM), the VMM to manage a virtual machine (VM) including virtual processors. The processing core to execute, via the VM, a plurality of conversion instructions on at least one of the virtual processors to convert a plurality of non-secure pages to a plurality of secure pages. The processing core also to execute, via the VM, one or more allocation instructions on the at least one of the virtual processors to allocate at least one secure page of the plurality of secure pages, execution of the one or more allocation instructions to include determining whether the TLB is cleared of mappings to the at least one secure page prior to allocating the at least one secure page.

22 Claims, 17 Drawing Sheets

(51) Int. Cl.
  *G06F 12/14*  (2006.01)
  *G06F 9/455*  (2018.01)
(52) U.S. Cl.
  CPC .............. *G06F 12/1408* (2013.01); *G06F 2009/45587* (2013.01); *G06F 2212/1052* (2013.01); *G06F 2212/65* (2013.01); *G06F 2212/68* (2013.01)

(56) References Cited

U.S. PATENT DOCUMENTS

| | | | |
|---|---|---|---|
| 7,512,769 B1 | 3/2009 | Lowell et al. | |
| 9,767,044 B2 | 9/2017 | Chhabra et al. | |
| 9,875,189 B2 | 1/2018 | Zmudzinski et al. | |
| 2002/0062409 A1* | 5/2002 | Lasserre | G06F 1/206 710/22 |
| 2003/0204693 A1 | 10/2003 | Moran et al. | |
| 2004/0143720 A1* | 7/2004 | Mansell | G06F 12/109 711/206 |
| 2005/0114607 A1* | 5/2005 | Cohen | G06F 12/1027 711/135 |
| 2008/0140897 A1* | 6/2008 | Ganguly | G06F 12/1027 710/268 |
| 2008/0244155 A1 | 10/2008 | Lee et al. | |
| 2008/0307188 A1 | 12/2008 | Franaszek et al. | |
| 2011/0010483 A1 | 1/2011 | Liljeberg | |
| 2011/0099387 A1 | 4/2011 | Gremaud et al. | |
| 2014/0025924 A1 | 1/2014 | Satoyama et al. | |
| 2015/0089173 A1* | 3/2015 | Chhabra | G06F 12/1408 711/163 |
| 2015/0186678 A1* | 7/2015 | Leslie-Hurd | G06F 21/74 726/26 |
| 2015/0301939 A1* | 10/2015 | Bybell | G06F 12/1027 711/207 |
| 2015/0324139 A1 | 11/2015 | Inoue et al. | |
| 2016/0239430 A1 | 8/2016 | Tsirkin et al. | |
| 2016/0364338 A1 | 12/2016 | Zmudzinski et al. | |
| 2017/0068455 A1 | 3/2017 | Xing et al. | |

* cited by examiner

TRACKING AND MANAGING TRANSLATION LOOKASIDE BUFFERS

The present disclosure pertains to computer systems; more specifically, to tracking and managing guest entries in a translation lookaside buffer (TLB) of a computer system.

BACKGROUND

Modern processing devices are designed to protect sensitive data in memory from both hardware and software attacks. Some processing devices provide cryptographic mechanisms to convert a non-secure page of memory to a secure page of memory. The cryptographic mechanisms may be for encryption, integrity, and replay protection. Memory encryption protects the confidentiality of memory-resident data. On the other hand, integrity protection prevents an attacker from causing any hidden modifications to the ciphertext (i.e., encrypted data, as opposed to plaintext which is unencrypted data) in memory, and replay protection eliminates any undetected temporal substitution of the ciphertext. Once a non-secure page of memory is converted to a secure page of memory, an application that has access to old memory mapping entries to the now secure page may lead to undesirable results.

DESCRIPTION OF EMBODIMENTS

Figure 1A:
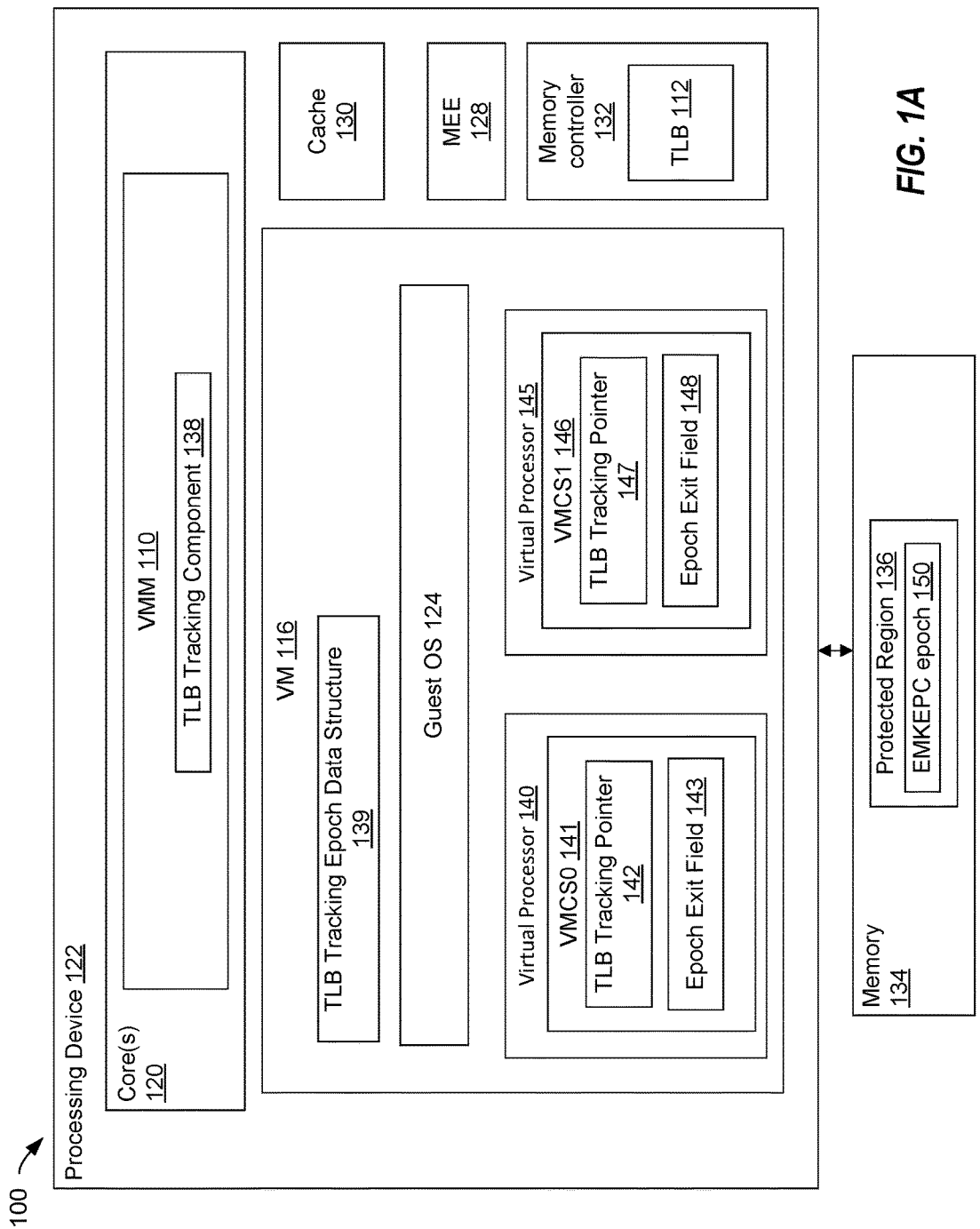
FIG. 1A is a block diagram illustrating an example computing system that implements a virtual machine monitor (VMM) for implementing tracking and managing guest entries in a translation lookaside buffer (TLB) according to one embodiment.

Guest translation lookaside buffers (TLBs) tracking and managing technologies are described. A processing device may include a processing device core and a main memory. The memory may include pages that can be converted to secure pages or non-secure pages. Software executing on the processing device can identify a page in main memory to be converted and can use a page conversion instruction to convert the page. The processing device core, in response to a page conversion instruction, may determine from the instruction the page in memory range to be converted and convert the page to be a secure page or a non-secure page. System software (e.g., operating system (OS) or virtual machine monitor (VMM)) may identify a page that can be converted. For example, if the OS requests a secure page (and a secure page is not available), the OS identifies a non-secure page and executes the page conversion instruction on this non-secure page. The memory may also include multiple convertible sections that can be converted in response to a section conversion instruction.

Memory encryption protects the confidentiality of memory-resident data. Memory encryption is primarily designed to protect against passive attacks where an attacker tries to silently observe the data lines as the data lines move on and off the processing device die. Some processing devices include an encryption module that encrypts sensitive data before the data is stored into a protected region of the memory. On a memory read to the protected region, the data line is decrypted before being fed into the processing device. The encryption and decryption algorithms can be chosen based on the security level required by the user.

Secure containers, referred to herein as Secure Enclaves (SEs), may be created. The SEs are designed to protect third-party secrets from both hardware and software attacks. SE can protect the confidentiality of enclave secrets by storing the enclave secrets using encryption when the enclave secrets are resident in platform memory. In order to provide complete protection from hardware attacks, SEs provide integrity protection and replay protection. In the absence of such protections, an attacker with physical access to the system can record snapshots of enclave cache lines and replay them at a later point in time. In order to achieve these protections, SEs employ a memory encryption engine (MEE), which provides cryptographic mechanisms for encryption, integrity, and replay protection. The MEE is a hardware unit that implements the cryptographic functionality to secure pages when they are in memory. More specifically, the MEE can encrypt any cache line that gets evicted out of the processing device if it belongs to a secure page and the MEE also provides integrity protection and replay-protection for the secure pages. The MEE may reserve a range of platform memory statically at boot time and enforce the cryptographic protections on this range of memory. This secure memory range may include an integrity and replay-protection tree that the MEE uses to secure Enclave Page Cache (EPC) pages. EPC pages may refer to secure pages that are encrypted and integrity protected by the MEE. This secure memory range may be hardware reserved and cover any convertible pages.

Conversion instructions may be executed to convert convertible pages to EPC (e.g., also referred to as "secure") and back to non-EPC. It should be understood that "secure" and "EPC" are used interchangeably herein. The instructions may include a page conversion instruction (referred to as an EMKEPC instruction herein) to convert a non-secure convertible page to an EPC page, and a page allocation instruction (referred to as an EPCALLOC instruction herein) to allocate the converted EPC page in memory. When the EPC page is converted using the EMKEPC instruction, the EPC page may be a free page that has not yet been assigned to an application. The free EPC page may not be accessible to applications until allocation occurs. Once the EPCALLOC instruction executes, the EPC page may become allocated and available for use by an application (e.g., an application may start making changes to the EPC page).

Mappings to EPC pages used by applications may be made using extended page tables (EPTs) and/or page tables. The applications may perform writes to the pages mapped to the applications, among other things. The mappings may be stored in caching mechanisms referred to herein as translation lookaside buffers (TLBs). A TLB may refer to a hardware data structure. The TLB may be a memory cache that is used to reduce application access time to pages that have been recently accessed by the applications. There may be one TLB per hardware thread. The mappings stored in the TLB, as noted above, may include translations from linear to physical addresses of the pages accessed by the applications. Entries in the TLB may be tagged with a process-context identifier (PCID), which may enable system software to clear the entries associated with a particular process (e.g., a virtual machine (VM)). Undesirable results may occur when non-secure applications access stale entries to EPC pages stored in the TLBs.

For example, an application may be executing and using a non-secure page. The application has been exercising its mapping to the non-secure page, so the mapping is cached in a TLB. The application can write to the non-secure page via the mapping in the TLB. If the non-secure page is then converted to a secure page using the EMKEPC instruction, the mapping to the non-secure page, which is now a secure page, may still be cached in the TLB. As such, the security checks provided by the EPC page may be bypassed by the application accessing the TLB and writing to the secure page. That is, a non-secure application may modify a secure page if the TLB is not cleared properly. Such an action may cause the MEE to identify that the secure page has been tampered with and cause undesirable behavior (e.g., fault, timeout, shutdown, etc.).

This undesirable behavior may occur in virtualized environments where different guest operating systems (OSes) are running on respective virtual machines (VMs). Since the VMM allows the VMs access to hardware of a computing device, one guest OS could potentially cause the undesirable behavior that, in turn, affects each of the other guest OSes. Thus, in some embodiments, a VMM performs operations to support proper functioning of a guest OS such that the guest OS may not cause the undesirable behavior. The VMM may support proper functioning of the guest OSes by invalidating each guest TLB entry in a TLB after an EPC page is created (e.g., EMKEPC instruction executed) and prior to allocating the EPC page (e.g., EPCALLOC instruction executed). In some instances, the VMM flushes all guest TLB entries in the TLB when page sharing is enabled to remove any stale mappings to the page being converted. In other instances, when page sharing is not enabled by the VMM, the VMM may flush only those entries in the TLB with PCID associated with the process (e.g., VM) performing the page conversion. Invalidating guest TLB entries may be referred to as a TLB shoot-down herein. For example, a TLB shoot-down may include the VMM invalidating guest TLB entries by clearing the guest TLB entries from a TLB. The guest TLB entries may include mappings of guest applications to pages (e.g., non-secure, secure).

Conventional systems for secure memory cause the VMM to exit on each memory conversion in order to perform guest TLB shoot-downs. Also, the VMM had to track which pages were being converted to correctly map the pages in a page table. Embodiments of the disclosure enable a VMM to prevent the undesirable behavior without having to track which pages are being converted by the guest OSes. Furthermore, if a guest OS batches multiple page conversions (e.g., EMKEPC instructions) followed by corresponding EPCALLOC instructions to the converted pages, the processing device executing the guest OS may trigger a single VM exit and the VMM may perform a TLB shoot-down operation that covers an entire batch of EMKEPC instructions. That is, the disclosed embodiments enable the VMM to avoid unnecessary TLB shoot-downs and VM exit operations by limiting the number of TLB shoot-downs and VM exits taken. As such, the disclosed embodiments may enhance performance of a processing device by limiting the number of VM exits and TLB shoot-downs.

More specifically, since the undesirable behavior may not occur until the EPC page is allocated (by executing the EPCALLOC instruction for the EPC page), a VM exit to enable the VMM to perform the TLB shoot-downs may not happen until the guest OS attempts the EPCALLOC instruction on the secure page. As such, if the guest converts several pages to EPC with the EMKEPC instructions before executing the EPCALLOC instruction on those EPC pages, a VM exit is not delivered until the first instance of the EPCALLOC instruction, and no additional VM exits are delivered until another round of EMKEPC/EPCALLOC instructions that may involve clearing of the guest VM's TLB entries.

Such a round of EMKEPC/EPCALLOC instructions may be referred to as a guest epoch herein. A guest epoch may be expressed as a value that represents a period of time during which mappings to pages may be made. EMKEPC/EPCALLOC instructions may be executed on multiple guest OSes within the same guest epoch. A beginning of a guest epoch is marked by the execution of the first EMKEPC instruction and the end of a guest epoch is marked by an attempt to execute the first EPCALLOC instruction on one of the EPC pages converted in that guest epoch. When the VMM sets a VM-execution control, referred to as enable EMKEPC TLB epoch exiting herein, in embodiments of the disclosure, the processing device executing the guest OS may deliver one VM exit at the end of each guest epoch. In some embodiments, the guest OS may deliver VM exits on multiple guest threads (e.g., virtual processor) if the guest OS attempts concurrent EPCALLOC instructions on EPC pages belonging to the same guest epoch. On the other hand, the processing device executing the guest OS may not deliver a VM exit if the EPCALLOC instruction is executed on an EPC page belonging to an older guest epoch.

FIG. 1A is a block diagram illustrating an example computing system 100 that implements a virtual machine monitor (VMM) 110 for implementing tracking and managing guest entries in a translation lookaside buffer (TLB) 112 according to one embodiment. The VMM 110 may refer to software, firmware, or hardware to create, run, and manage a virtual machines (VM) 116. It should be noted that the VMM 110 may create, run, and manage one or more VMs, such as VM 116. As depicted, the VMM 110 is included as a component of one or more processing cores 120 of a processing device 122. The VMM 110 may create and run the VM 116 and allocate one or more virtual processors (e.g., virtual processor 141 and virtual processor 145) to the VM 116. The VM 116 may be referred to as guest 116 herein. It should be understood that the guest 116 may include just one virtual processor or multiple virtual processors. The VMM 110 may allow the guest 116 to access hardware of the computing system 100. The guest 116 may execute a guest operating system (OS) 124. The VMM 110 may manage the execution of the guest OS 124. The guest OS 124 may function to control access of virtual processor 141 and virtual processor 145 to underlying hardware and software resources of the computing system 100. It should be noted that, when there are numerous guests operating on the processing device 122, the VMM 110 may manage each of the guest OSes executing on the numerous guests.

The processing device 122 may also implement a memory encryption engine (MEE) 128 for implementing secure memory. Secure memory ranges (also referred to as the convertible ranges) may be setup at boot time by a basic input-output system (BIOS). The processing device 122 executes instructions to convert pages in these convertible ranges as guided by software executing on the processing device 122, such as an operating system (OS), the VMM 110, or the guest OS 124. The processing device 122 further executes instructions to delay secure pages from being allocated until the TLB 112 is cleared, among other things. The processing device 122 may be used in a system that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the processing device 122 may be used in a system on a chip (SoC) system.

The computing system 100 is representative of processing systems based on the PENTIUM III™, PENTIUM 4™, Xeon™, Itanium, XScale™ and/or StrongARM™ microprocessing devices available from Intel Corporation of Santa Clara, Calif., although other systems (including PCs having other microprocessing devices, engineering workstations, set-top boxes and the like) may also be used. In one embodiment, sample system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

The one or more processing cores 120 execute instructions of the system. The processing core 120 includes, but is not limited to, pre-fetch logic to fetch instructions, decode logic to decode the instructions, execution logic to execute instructions and the like. The processing device 122 includes a cache 130 to cache instructions and/or data. The cache 130 includes, but is not limited to, level one, level two, and a last level cache (LLC), or any other configuration of the cache memory within the processing device 122. In an embodiment, the computing system 100 includes a component, such as the processing device 122 to employ execution units including logic to perform algorithms for processing data.

The processing device 122 may also include a memory controller 132. The memory controller 132 may perform functions that enable the processing device 122 to access and communicate with a main memory 134 that includes a volatile memory and/or a non-volatile memory. In an embodiment, the memory controller 132 may include the TLB 112. The TLB 112 may be a memory cache that includes entries of mappings between applications and pages. The entries may be entered in the TLB 112 when an application accesses a respective page. In one embodiment, the MEE 128 is located between a last level cache and the memory controller 132 to perform encryption, decryption and authentication of the data lines moving in and out of a protected region 136 of the main memory 134. In one embodiment, the MEE 128 is located on the processing device die, while the memory 134 is located off the processing device die.

For the following description, the following terminology is used for the main memory 134: The main memory 134 is divided into regions, including one or more protected regions 136 (also referred to herein as secure memory range or MEE region). Each region has multiple sections: an EPC section, which is convertible at page granularity, a hardware reserved section of replay-protection and integrity metadata, which is not convertible, and another hardware reserved section which is internal to implementation and is secure but not available for conversion. In one embodiment, the protected region (MEE region) may be a fixed range or multiple protected regions (MEE regions) may be a set of multiple fixed ranges. In another embodiment, the entire memory could be configured as flexible memory, divided into multiple MEE regions. At startup, the entire memory starts as non-secure and the system software converts it as guided by the demand for secure memory on the system. As described herein, the main memory 134 may include multiple secure MEE regions, and may also include non-secure memory ranges.

In one embodiment, the guest OS 124 executing on the guest 116 can identify a convertible, non-secure page in a memory range (e.g., protected region 136) in main memory 134 and use a page conversion instruction (EMKEPC) to convert the convertible page to an EPC page. If an application executed by the guest OS 124 had accessed the non-secure page prior to the conversion instruction, then a mapping entry between the application and the non-secure page would exist in the TLB 112. Thus, without using the disclosed embodiments, when the non-secure page is converted to the EPC page, the non-secure application may be able to access the secure page using the mapping in the TLB 112. The non-secure application may corrupt the EPC page by modifying it, which may cause the undesirable behavior of the computing system 100.

To prevent this, the VMM 110 may include a TLB tracking component 138 that clears the TLB 112 of any guest TLB entries (e.g., mappings to secure pages) prior to allowing the guest 116 to allocate any EPC pages. Clearing the TLB 112 removes any stale mappings to the EPC pages from the TLB 112 such that the stale mappings are not accessible to non-secure applications. The TLB tracking component 138 may be implemented as computer instructions stored in any memory of the computing system 100 and executable by the one or more processing cores 120. The TLB tracking component 138 may perform various TLB tracking and managing operations. For example, the TLB tracking and managing operations may include, but are not limited to, setting the VM-execution control (enable EMKEPC TLB epoch exiting) on each virtual processor 140 and virtual processor 145 belonging to the guest 116, allocating a TLB tracking epoch data structure 139 of the guest 116, managing a guest epoch (described further below) for the guest 116, handling VM exits from the logical processors (virtual processor 140 and virtual processor 145), and resuming the VM 116 after the VM exit is handled, as described in more detail below. In some embodiments, handling the VM exit (by the TLB tracking component 138 of the VMM 110) may include incrementing the current value of the guest epoch and setting a tracking in progress (TIP) bit, performing TLB shoot-downs, waiting until the TLB 112 is cleared, verifying that the TLB 112 is cleared, clearing the TIP bit, and/or resuming the VM that delivered a VM exit.

In embodiments of the disclosure, the VMM 110 can enable EMKEPC TLB epoch exiting via the TLB tracking component 138 of the VMM 110. The VMM 110 may set a VM-execution control on all virtual processors 140, 145 belonging to the same guest 116 in order to enable EMKEPC TLB epoch exiting. When enabled, the enable EMKEPC TLB epoch exiting execution control causes the guest OS 124 to perform various TLB tracking and managing operations on the virtual processor 140 and virtual processor 145 when requests to convert non-secure pages to secure pages are received. When EMKEPC TLB epoch exiting is enabled, the TLB tracking component 138 allocates the TLB tracking epoch data structure 139, which may include an n-bit data structure. In some embodiments, the TLB tracking epoch data structure 139 includes a 64-bit data structure where bits 62:0 are used for the current value of the guest epoch and bit 63 is used for a tracking in progress (TIP) bit. When the VMM 110 allocates the TLB tracking epoch data structure 139, the VMM 110 may initialize the guest epoch current value to 0. It should be understood that the VMM 110 uses the TLB tracking epoch data structure 139 to maintain the current value of the guest epoch. As described herein, the VMM 110 may increment the current value of the guest epoch in the TLB tracking epoch data structure 139 when performing TLB tracking and managing operations.

As depicted, each virtual processor 140 and virtual processor 145 may include a virtual machine control structure (VMCS) (e.g., VMCS0 141 and VMCS1 146). The VMCS 141, 146 may refer to a data structure that stores information used to control certain VM operations, such as VM entries and VM exits. The VMCS 141, 146 may be manipulated by clear, read, and/or write instructions, among others. As depicted, the VMM 110 may use the VMCS 141 and 146 for each virtual processor 140 and 145. In some embodiments, a different VMCS may be used for each VM supported on the processing device 122. The VMCS0 141 and VMCS1 146 may be associated with a region in the memory 134 referred to as the VMCS region.

In some embodiments, the VMM 110 (e.g., via TLB tracking component 138) may set a guest TLB tracking pointer 142 and 147 in each respective VMCS0 141 and VMCS1 146 to the TLB tracking epoch data structure 139. Further, the VMCS0 141 and VMCS1 146 may each include an epoch exit field 143 and 148. The epoch exit field 143 may be populated with certain information (e.g., the guest epoch value) by the virtual processor 140 and virtual processor 145 when a VM exit is delivered. It should be noted that, although VMCS0 141 and VMCS1 146 are shown as examples, any suitable data structure may be used.

To illustrate how the VMM 110 generally manages a guest epoch for the guest 116, assume, in one example, that the current value of the guest epoch is 3 and mappings to a non-secure page are allowed based on rules of the processing device 122. An application running on the guest OS 124 may access the non-secure page and an entry to the non-secure page may be added to the TLB 112. Then, the guest OS 124 may request to convert the non-secure page to an EPC page (e.g., using an EMKEPC instruction), and the VMM 110 may increment the current value of the guest epoch to a value of 4. Rules of the processing device 122 block making new mappings to the EPC page in guest epoch 4. The VMM 110 incremented the guest epoch to 4 so the VMM 110 can track that the EPC page entered a new zone where no mappings have been made to the secure page. Any threads (e.g., virtual processors 141, 145) of the guest 116 running in guest epoch 4 do not have mappings to the EPC page, but any threads that had been running in guest epoch 3 might still have mappings to the EPC page because the mappings were made in the TLB 112 prior to the processing device 122 blocking the new mappings. As such, the VMM 110 clears the TLB 112 (e.g., by performing a TLB shoot-down) prior to the secure page being allocated (e.g., via an EPCALLOC instruction) in guest epoch 4. Since there is a new guest epoch (e.g., guest epoch 4) and the TLB 112 has been cleared, the thread can carry out the EPCALLOC instruction without corrupting the EPC page. It should be understood that the above illustration is a high level example and additional details related to the operations of the VMM 110 are provided below.

As discussed above, the VMM 110 can enable EMKEPC TLB epoch exiting via the TLB tracking component 138 of the VMM 110 which, in turn, causes the guest OS 124 to perform various TLB tracking and managing operations on the virtual processor 140 and virtual processor 145 when requests to convert non-secure pages to secure pages are received. The TLB tracking and managing operations performed by the guest OS 124 may include storing the value of the guest epoch at the time the page is converted in a secure area of the memory 134 (e.g., an EMKEPC epoch 150 of the protected region 136) when executing the EMKEPC instruction, and delivering a VM exit if the EPC page is converted (e.g., allocated via an EPCALLOC instruction) in the current epoch, if a TLB shoot-down for the current epoch is still in progress prior to executing the EPCALLOC instruction. The EMKEPC epoch 150 may refer to a field (e.g., an Enclave Page Cache Map (EPCM) field) located in a secure area (e.g., the protected region 136) of the memory 134 and the EMKEPC epoch 150 may include metadata associated with each secure page.

In some embodiments, the EMKEPC instruction may be a hardware conversion instruction that converts the non-secure, convertible page to a secure page (EPC page) and blocks access to the secure page. There may be no new mappings made to the secure page until the EPCALLOC instruction allocates the page. Thus, the VMM 110 may support proper functioning of the VM 116 by clearing the TLB 112 of any stale mappings to the secure pages (e.g., that were made to the secure page when it was non-secure) so non-secure applications may not corrupt the secure pages. Execution of the EPCALLOC instruction includes determining whether the current value of the guest epoch has been incremented and whether there is tracking in progress currently being performed for the current guest epoch by the VMM 110. If the current value of the guest epoch has been incremented in the TLB tracking epoch data structure 139 and there is no tracking in progress currently performed for the guest epoch by the VMM 110, the guest OS 124 executes the EPCALLOC instruction. Otherwise, the guest OS 124 delivers a VM exit.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processing device (DSP), system on a chip, network computers (NetPC), set-top boxes, network hubs, wide area network (WAN) switches, or any other system that can perform one or more instructions in accordance with at least one embodiment.

One embodiment may be described in the context of a single processing device desktop or server system, but alternative embodiments may be included in a multiprocessing device system. System 100 may be an example of a 'hub' system architecture. The computer system 100 includes a processing device 122 to process data signals. The processing device 122, as one illustrative example, includes a complex instruction set computer (CISC) microprocessing device, a reduced instruction set computing (RISC) microprocessing device, a very long instruction word (VLIW) microprocessing device, a processing device implementing a combination of instruction sets, or any other processing device, such as a digital signal processing device, for example. The processing device 122 is coupled to a processing device bus that transmits data signals between the processing device 122 and other components in the system 100, such as memory 134 storing instruction, data, or any combination thereof. The other components of the system 100 may include a graphics accelerator, a memory controller hub, an I/O controller hub, a wireless transceiver, a Flash BIOS, a network controller, an audio controller, a serial expansion port, an I/O controller, etc. These elements perform their conventional functions that are well known to those familiar with the art.

In one embodiment, the processing device 122 includes a Level 1 (L1) internal cache memory. Depending on the architecture, the processing device 122 may have a single internal cache or multiple levels of internal caches. Other embodiments include a combination of both internal and external caches depending on the particular implementation and needs. A register file is to store different types of data in various registers including integer registers, floating point registers, vector registers, banked registers, shadow registers, checkpoint registers, status registers, configuration registers, and instruction pointer register.

It should be noted that the execution unit may or may not have a floating point unit. The processing device 122, in one embodiment, includes a microcode (ucode) ROM to store microcode, which when executed, is to perform algorithms for certain macroinstructions or handle complex scenarios. Here, microcode is potentially updateable to handle logic bugs/fixes for processing device 122.

Alternate embodiments of an execution unit may also be used in micro controllers, embedded processing devices, graphics devices, DSPs, and other types of logic circuits. System 100 includes a memory 134. Memory 134 includes a dynamic random access memory (DRAM) device, a static random access memory (SRAM) device, flash memory device, or other memory device. Memory 134 stores instructions and/or data represented by data signals that are to be executed by the processing device 122. The processing device 122 is coupled to the memory 134 via a processing device bus. A system logic chip, such as a memory controller hub (MCH) may be coupled to the processing device bus and memory 134. An MCH can provide a high bandwidth memory path to memory 134 for instruction and data storage and for storage of graphics commands, data and textures. The MCH can be used to direct data signals between the processing device 122, memory 134, and other components in the system 100 and to bridge the data signals between processing device bus, memory 134, and system I/O, for example. The MCH may be coupled to memory 134 through a memory interface. In some embodiments, the system logic chip can provide a graphics port for coupling to a graphics controller through an Accelerated Graphics Port (AGP) interconnect. The system 100 may also include an I/O controller hub (ICH). The ICH can provide direct connections to some I/O devices via a local I/O bus. The local I/O bus is a high-speed I/O bus for connecting peripherals to the memory 134, chipset, and processing device 122. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

For another embodiment of a system, the instructions executed by the processing device core 120 described above can be used with a system on a chip. One embodiment of a system on a chip comprises of a processing device and a memory. The memory for one such system is a flash memory. The flash memory can be located on the same die as the processing device and other system components. Additionally, other logic blocks such as a memory controller or graphics controller can also be located on a system on a chip.

Figure 1B:
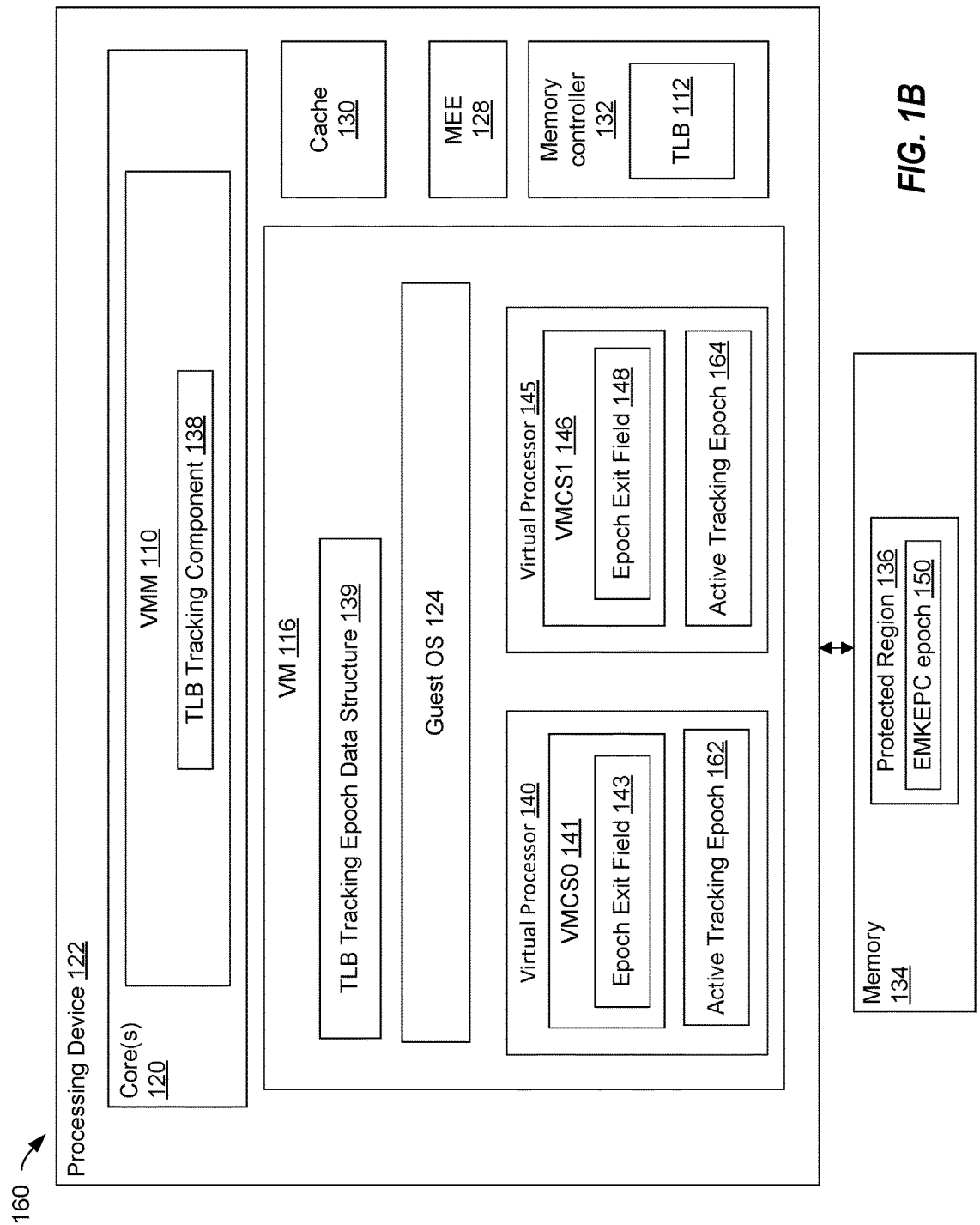
FIG. 1B is a block diagram illustrating another example computing system that implements a virtual machine monitor (VMM) for implementing tracking and managing guest entries in a translation lookaside buffer (TLB) according to one embodiment.

FIG. 1B is a block diagram illustrating another example computing system 160 that implements the virtual machine monitor (VMM) 110 for implementing tracking and managing guest entries in the TLB 112 according to one embodiment. As depicted, the computing system 160 includes similar components to the computing system 100 of FIG. 1A. For example, the computing system 160 includes the processing device 122, which includes one or more processing cores 120 executing the VMM 110. The VMM 110 includes the TLB tracking component 138. Additionally, the processing device 122 includes the cache 130, the MEE 128, and the memory controller 132 including the TLB 112. Further, the processing device 122 is also executing the VM 116 that includes the TLB tracking epoch data structure 139, the guest OS 124, and the virtual processor 140 and virtual processor 145. The virtual processors 140 and 145 of the computing system 160 include the VMCS 141 and 146. Each of the VMCS 141 and 146 include the epoch exit field 143 and 148, respectively, similar to the computing system 100 of FIG. 1A. Further, the computing system 160 also includes the memory 134 operatively coupled to the processing device 122. The memory 134 includes the protected region 136 that includes the EMKEPC epoch 150 (e.g., an Enclave Page Cache Map field that tracks when the EMKEPC instruction was executed). It should be noted that the similar components of the computing system 160 may function similarly as described above with regard to the computing system 100 of FIG. 1A.

As depicted, the virtual processor 140 and virtual processor 145 of the computing system 160 also include different components than the virtual processor 140 and virtual processor 1 145 of the computing system 100 of FIG. 1A. For example, the virtual processor 140 and 145 include an active tracking epoch 162 and 164. The active tracking epoch 162 and 164 may be architectural model-specific registers (MSR). Each of the active tracking epoch 162 and 164 may include a valid bit field at bit 0 (set to opt the virtual processor into TLB tracking), reserved bits 5:1, address bits (MAX_PHYS_BITS):6 (physical address of the current value of the guest epoch in the TLB tracking epoch data structure 139), and reserved bits 63:MAX_PHYS_BITS.

In some embodiments, the VMM 110 may enable VM exits for conversion instructions including EMKEPC. The VM exits may occur prior to these instructions executing. As such, the VMM 110 executes these instructions on behalf of the guest 116 that attempted them. There are two execution paths for these conversion instructions depending on whether they are being executed by the guest 116 or by the VMM 110. When executed by the VMM 110, the instructions do not have access to the guest VMCS 141 or 146. Accordingly, on this execution path, the VMM 110 may not access the TLB tracking pointer 142 and 147 in the VMCS 141 and 146. Thus, if the VMM 110 tries to exit on EMKEPC instruction attempts and to execute EMKEPC instructions on behalf of the guest 116, since EMKEPC instruction may not access the TLB tracking epoch data structure 139 to retrieve the current value of the guest epoch to store in the EMKEPC epoch 150, the VMM 110 invalidates guest TLB entries each time it executes the EMKEPC instruction because the VM exit on the EPCALLOC instruction may not be forthcoming.

If, on the other hand, the address to the TLB tracking epoch data structure 1139 is placed in an MSR (active tracking epoch 162 and 164), the EMKEPC instruction may access the TLB tracking epoch data structure 139 regardless of the execution path. Accordingly, the VMM 110 may not invalidate guest TLB entries after executing the EMKEPC instruction because the current value of the guest epoch may be stored in the EMKEPC epoch 150 and the VM exit from the EPCALLOC instruction may be generated when the EMKEPC was executed in the current guest epoch or a TLB shoot-down is in progress for the current guest epoch.

The VMM 110 may allocate one TLB tracking epoch data structure 139 per guest 116 and sets the address bits in each of the active tracking epoch 142 and 147 on each of the virtual processor 140 and 145 to the address of the current value of the guest epoch in the TLB tracking epoch data structure 139 and sets the value bit in each of the active tracking epoch 142 and 147 to "1".

In some embodiments, when the VMM 110 allocates the TLB tracking epoch data structure 139, the VMM 110 initializes the current value of the guest epoch to 0. When the guest 116 executes the EMKEPC instruction, the lower 63 bits (current value of the guest epoch) are stored in the EMKEPC epoch 150 of the target secure page. Upon the guest 116 executing the EPCALLOC instruction for the target secure page, one or more determinations may be performed. For example, executing the EPCALLOC instruction may include a first determination whether the value stored in EMKEPC epoch 150 matches the current value of the guest epoch in the TLB tracking epoch data structure 139 to determine whether the target secure page was created in the current epoch. Also, executing the EPCALLOC instruction may include another determination whether a TLB shoot-down for the current epoch is still in progress (e.g., the guest epoch value stored in the EMKEPC epoch 150 is one less than the current value of the guest epoch and the TIP bit is set in the TLB tracking epoch data structure 139). If either of these conditions is true, the EPCALLOC instruction deposits the value of the EMKEPC epoch 150 into the epoch exit field 143 and 148 and delivers a VM exit. The VMM 110 handles these VM exits by either performing a TLB shoot-down or by waiting or retrying the EPCALLOC instruction until the TLB shoot-down completes.

Figure 2A:
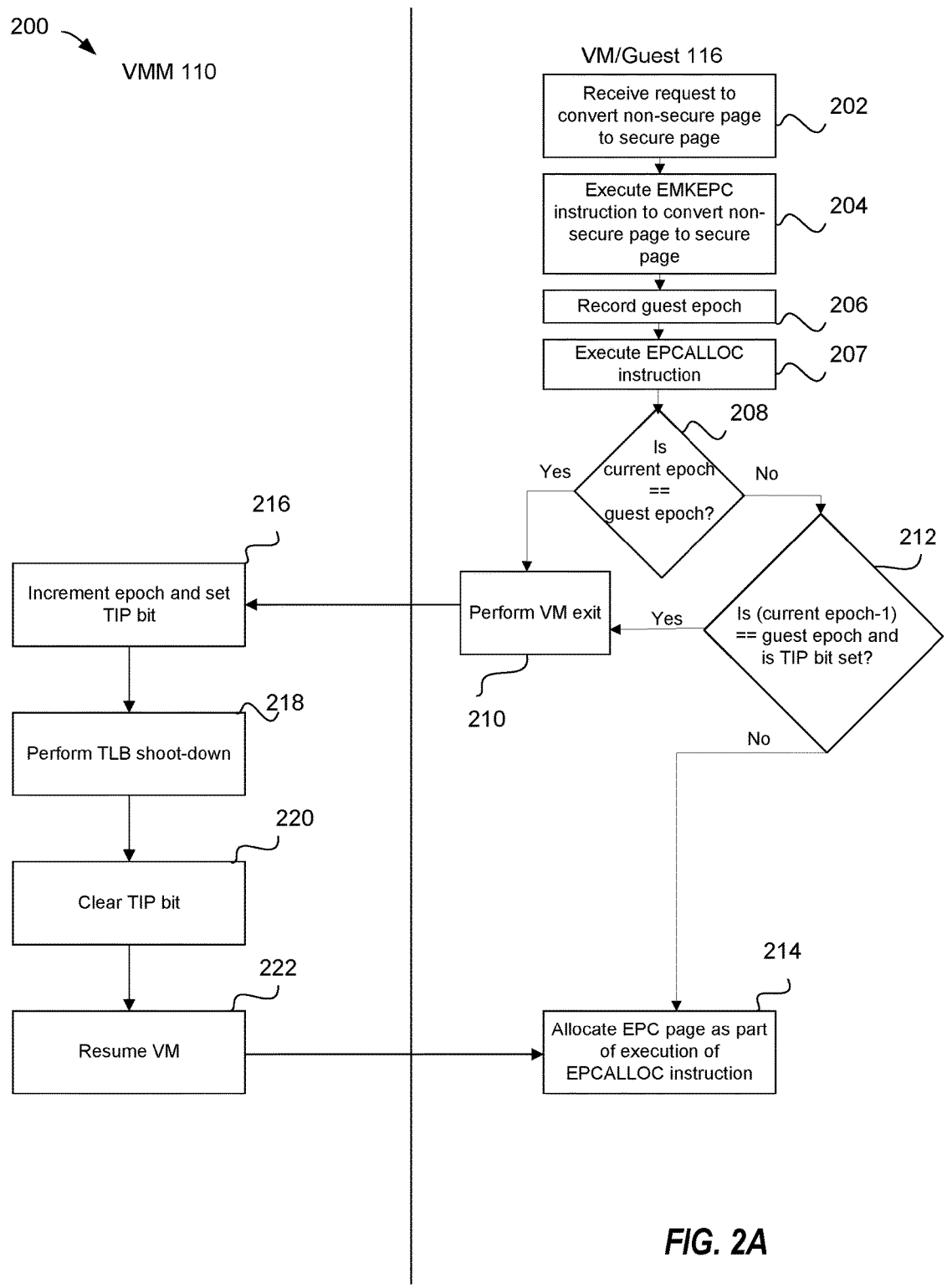
FIG. 2A is a flow diagram of an example method for tracking and managing guest entries in a TLB in a virtualized environment according to one embodiment.

FIG. 2A is a flow diagram of an example method 200 for tracking and managing guest entries in the TLB 112 in a virtualized environment according to one embodiment. Method 200 may be performed by processing logic that may comprise hardware (e.g., circuitry, dedicated logic, programmable logic, microcode, etc.), software (such as operations being performed by the MCU), firmware or a combination thereof. In one embodiment, method 200 is performed by processing device 122 of FIG. 1A or FIG. 1B. For example, some operations may be performed by the VMM 110 and the VM 116. In another embodiment, the method 200 is performed by any of the processing devices described with respect to FIGS. 7-13. Alternatively, other components of the computing system 100 (or software executing on the processing device 122) may perform some or all of the operations of the method 200.

Referring to FIG. 2A, the method 200 begins by the processing logic executing the VM 116 receiving (block 202) a request to convert a non-secure page to a secure page. The request may be received for any suitable reason. In an example, the VM 116 may determine to convert the page based on memory demands. The processing logic may execute (block 204) the EMKEPC instruction to convert the non-secure page to a secure EPC page. The EMKEPC instruction may also prevent applications of the VM 116 from accessing the converted EPC page while it is unallocated. Thus, there may be no new mappings cached in the TLB 112 to the converted EPC page after conversion.

The processing logic executing the VM 116 may record (block 206) the current value of the guest epoch at the time the EMKEPC instruction is executed in a secure place (e.g., protected region 136) in the memory. In one embodiment, the processing logic copies the current value of the guest epoch value from the TLB tracking epoch data structure 139 to the EMKEPC epoch 150 associated with the EPC page. The processing logic of the VM 116 may then execute (block 207) the EPCALLOC instruction. Executing the EPCALLOC instruction may include determining whether the TLB 112 may contain stale mappings to the target page or whether a TLB shoot-down is currently in progress for a given epoch. For example, in some embodiments, one determination may include determining (block 208) whether the current value of the guest epoch is equal to the stored value of the guest epoch (i.e., guest epoch value recorded at block 206) associated with the EPC page. In one embodiment, a current value of the guest epoch in the TLB tracking epoch data structure 139 is compared with the value of the guest epoch associated with the EPC page in the EMKEPC epoch 150. If the value of the guest epoch associated with the EPC page is the same as the current value of the guest epoch, then the VM 116 performs (block 210) a VM exit. In other words, the EPCALLOC instruction performs a VM exit at block 210 when it is determined at block 208 that the guest epoch associated with the EPC page indicates that the EPC page became secure in the current guest epoch.

If the current value of the guest epoch is not the same as the value of the guest epoch associated with the EPC page, then the EPCALLOC instruction may further include processing logic that performs another determination. The other determination may include determining (block 212) whether the value of the guest epoch associated with the EPC page is one less than the current value of the guest epoch and the tracking in progress (TIP) bit is set. In other words, the other determination may include determining whether the current value of the guest epoch is one more than the value of the guest epoch associated with the EPC page and the TIP bit is set. The value of the guest epoch may have a value that is one less than the current value of the guest epoch when the VMM 110 increments the current value of the guest epoch during exit handling, as described below. The TIP bit may be set when it has a value of "1" and may not be set when it has a value of "0". When the value of the guest epoch associated with the EPC page is one less than the current value of the guest epoch and the TIP bit is set, the VMM 110 may be performing a TLB shoot-down on another virtual processor. If the VMM 110 is currently performing a TLB shoot-down on another virtual processor, then there may still be stale entries to the converted EPC page in the TLB 112. Thus, the processing logic may perform (block 210) a VM exit. That is, while a TLB shoot-down is in progress on one virtual processor, any EPCALLOC attempt on a page from the same guest epoch on another virtual processor triggers the VM exit at block 210.

If the determinations indicate that the secure page was not converted in the current guest epoch and a TLB shoot-down is not in progress for the current guest epoch, then the processing logic may allocate (block 214) the EPC page as part of execution of the EPCALLOC instruction. When the page is allocated, secure applications may start accessing the secure page and making new mappings to the secure page in the TLB 112.

Performing the VM exit at block 210 may transfer control to the VMM 110. Upon receiving control, the processing logic executing the VMM 110 may cause the VMM 110 to increment (block 216) the current value of the guest epoch and set the TIP bit in the TLB tracking epoch data structure 139. In some embodiments, the VMM 110 may set the $63^{rd}$ bit (TIP bit) in the TLB tracking epoch data structure 139 to "1". The VMM 110 may perform (block 218) a TLB shoot-down by clearing (may also be referred to as "flushing") the TLB 112. Upon completion of the TLB shoot-down, the VMM 110 may clear (block 220) the TIP bit in the TLB tracking epoch data structure 139 by setting it to "0". The processing logic may resume (block 222) the guest 116. The VMM 110 may instruct the guest OS 124 that the current value of the guest epoch is incremented and the TLB 112 is cleared. The processing logic may cause the VM 116 to execute (block 214) the EPCALLOC instruction to allocate the secure page via the virtual processor 140 or virtual processor 145.

Accordingly, it should be understood that the EPCALLOC may not complete and allocate a secure page until the current value of the guest epoch has been incremented and the TIP bit has been cleared. Advancing to the next guest epoch (e.g., incrementing the current value of the guest epoch in the TLB tracking epoch data structure 139) and clearing the TIP bit communicates to the VM 116 that any potential stale mappings in the TLB 112 have been cleared. That is, a fresh guest epoch has been entered without any stale mappings, and the EPC page may be allocated. It should be further understood that, the VM 116 may execute multiple EMKEPC instructions to convert pages followed by corresponding EPCALLOC instructions for the converted EPC pages and a single VM exit may be triggered. Also, the VMM 110 may perform a single TLB shoot-down.

Figure 2B:
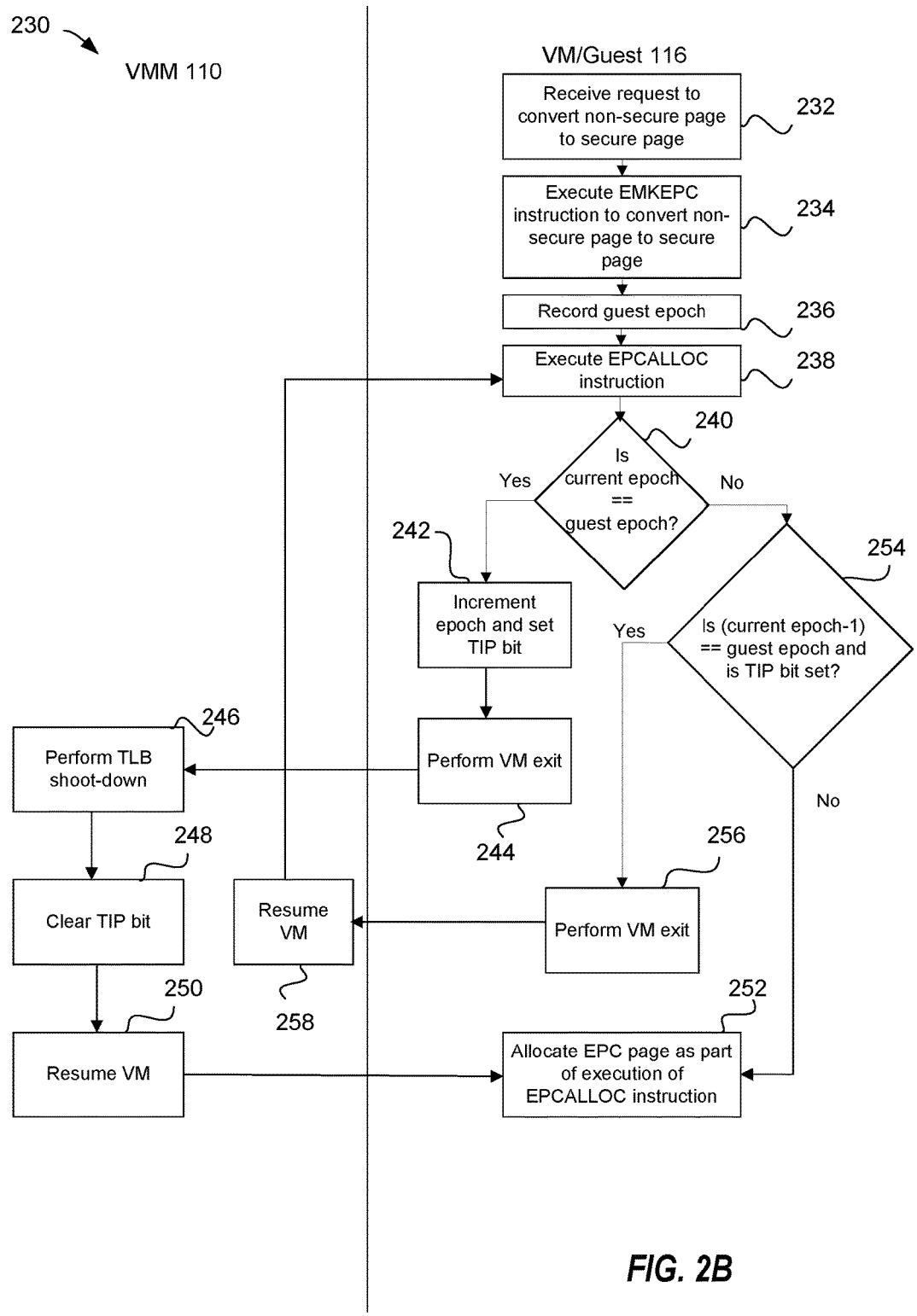
FIG. 2B is a flow diagram of another example method for tracking and managing guest entries in a TLB in a virtualized environment according to one embodiment.

FIG. 2B is a flow diagram of another example method 230 for tracking and managing guest entries in the TLB 112 in a virtualized environment according to one embodiment. Method 230 may be performed by processing logic that may comprise hardware (e.g., circuitry, dedicated logic, programmable logic, microcode, etc.), software (such as operations being performed by the MCU), firmware or a combination thereof. In one embodiment, method 230 is performed by processing device 122 of FIG. 1A or FIG. 1B. For example, some operations may be performed by the VMM 110 and the VM 116. In another embodiment, the method 230 is performed by any of the processing devices described with respect to FIGS. 7-13. Alternatively, other components of the computing system 100 (or software executing on the processing device 122) may perform some or all of the operations of the method 230.

Referring to FIG. 2B, the method 230 begins by the processing logic executing the VM 116 receiving (block 232) a request to convert a non-secure page to a secure page. The request may be received for any suitable reason. In an example, the VM 116 may determine to convert the page based on memory demands. The processing logic may execute (block 234) the EMKEPC instruction to convert the non-secure page to a secure EPC page. The EMKEPC instruction may also prevent applications of the VM 116 from accessing the converted EPC page while it is unallocated. Thus, there may be no new mappings cached in the TLB 112 to the converted EPC page after conversion.

The processing logic executing the VM 116 may record (block 236) the current value of the guest epoch at the time the EMKEPC instruction is executed in a secure place (e.g., protected region 136) in the memory. In one embodiment, the processing logic copies the current value of the guest epoch value from the TLB tracking epoch data structure 139 to the EMKEPC epoch 150 associated with the EPC page. The processing logic of the VM 116 may then execute (block 238) the EPCALLOC instruction. Executing the EPCALLOC instruction may include determining whether the TLB 112 may contain stale mappings to the target page or whether a TLB shoot-down is currently in progress for a given epoch. For example, in some embodiments, one determination may include determining (block 240) whether the current value of the guest epoch is equal to the stored value of the guest epoch (i.e., guest epoch value recorded at block 206) associated with the EPC page. In one embodiment, a current value of the guest epoch in the TLB tracking epoch data structure 139 is compared with the value of the guest epoch associated with the EPC page in the EMKEPC epoch 150.

If the value of the guest epoch associated with the EPC page is the same as the current value of the guest epoch, then the VM 116 may increment (block 242) the current value of the guest epoch and set the TIP bit in the TLB tracking epoch data structure 139. In some embodiments, the VM 116 may set the $63^{rd}$ bit (TIP bit) in the TLB tracking epoch data structure 139 to "1". The VM 116 may perform (block 244) a VM exit. The VM 116 may include information that instructs the VMM 110 to perform the TLB shoot-down of the guest TLBs and clear the TIP bit after performing the TLB shoot-down. For example, the VM 116 may update the epoch exit field 143 with such information prior to performing the VM exit.

Performing the VM exit at block 244 may transfer control to the VMM 110. Upon receiving control, the processing logic executing the VMM 110 may cause the VMM 110 to perform (block 246) a TLB shoot-down by clearing (may also be referred to as "flushing") the TLB 112 as instructed. Upon completion of the TLB shoot-down, the VMM 110 may clear (block 248) the TIP bit in the TLB tracking epoch data structure 139 by setting it to "0". The processing logic may resume (block 250) the guest 116. The VMM 110 may instruct the guest OS 124 that the current value of the guest epoch is incremented and the TLB 112 is cleared. The processing logic may cause the VM 116 to execute (block 252) the EPCALLOC instruction to allocate the secure page via the virtual processor 140 or virtual processor 145.

If the current value of the guest epoch is not the same as the value of the guest epoch associated with the EPC page, then the EPCALLOC instruction may further include processing logic that performs another determination. The other determination may include determining (block 254) whether the value of the guest epoch associated with the EPC page is one less than the current value of the guest epoch and the tracking in progress (TIP) bit is set. In other words, the other test may include determining whether the current value of the guest epoch is one more than the value of the guest epoch associated with the EPC page and the TIP bit is set. The value of the guest epoch may have a value that is one less than the current value of the guest epoch when the VM 116 increments the current value of the guest epoch, as described above. The TIP bit may be set when it has a value of "1" and may not be set when it has a value of "0". When the value of the guest epoch associated with the EPC page is one less than the current value of the guest epoch and the TIP bit is set, the VMM 110 may be performing a TLB shoot-down on another virtual processor.

If the VMM 110 is currently performing a TLB shoot-down on another virtual processor, then there may still be stale entries to the converted EPC page in the TLB 112. Thus, the processing logic may perform (block 256) a VM exit. That is, while a TLB shoot-down is in progress on one virtual processor, any EPCALLOC attempt on a page from the same guest epoch on another virtual processor triggers the VM exit at block 256. The VM 116 may include information that instructs the VMM 110 to resume the VM 116. For example, the epoch exit field 143 and/or 148 may be updated to include such information to instruct the VMM 110 how to handle the VM exit. Control may transfer to the VMM 110 where processing logic may cause the VMM 110 to resume (block 258) the VM 116. Upon resuming the VM 116, control may transfer back to the VM 116 to execute the EPCALLOC instruction to attempt to allocate the target secure page again.

If the determinations performed with the EPCALLOC instruction indicate that the secure page was not converted in the current guest epoch and a TLB shoot-down is not in progress for the current guest epoch, then the processing logic may allocate (block 252) the EPC page as part of execution of the EPCALLOC instruction. When the page is allocated, secure applications may start accessing the secure page and making new mappings to the secure page in the TLB 112.

Figure 3:
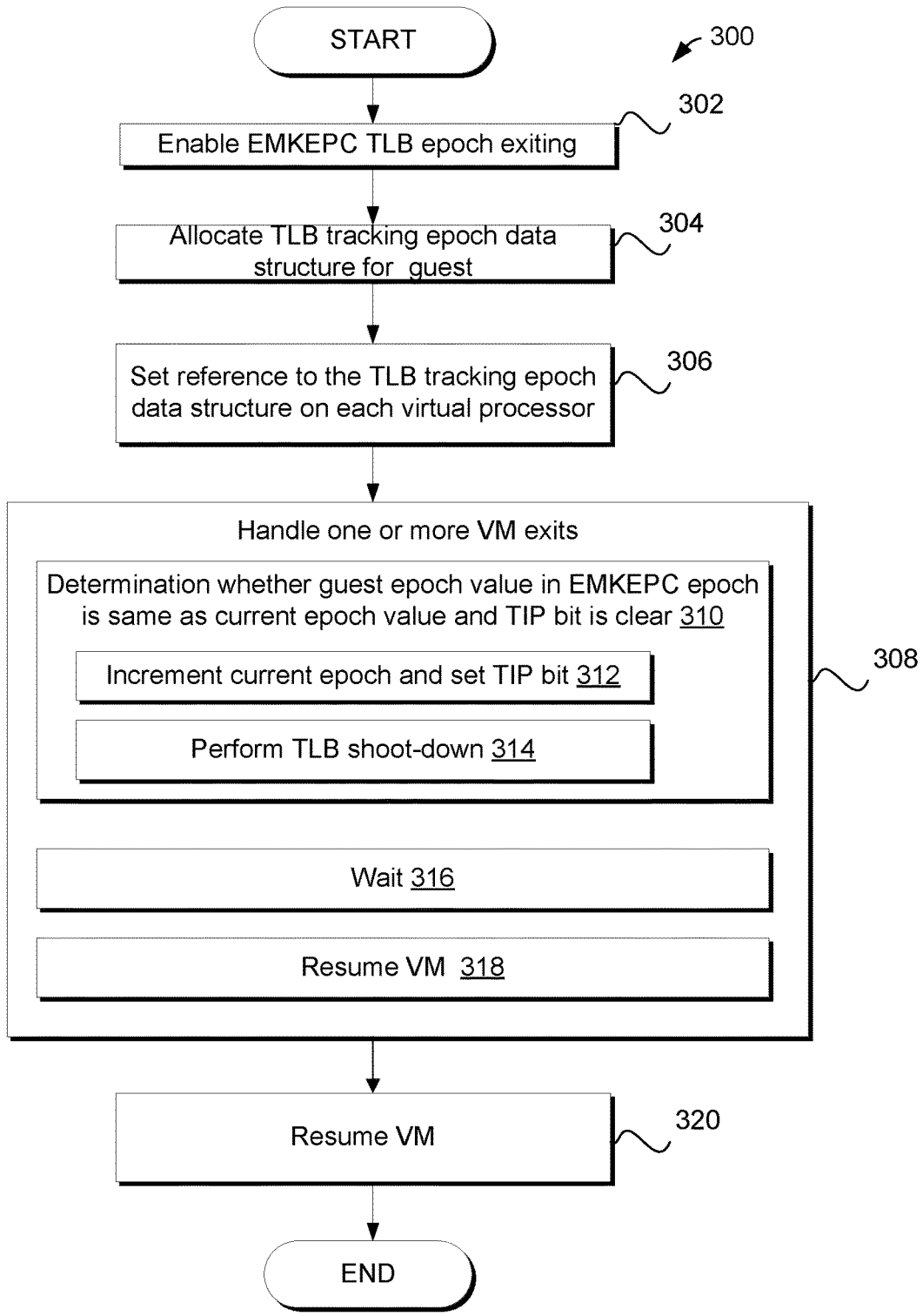
FIG. 3 is a flow diagram of an example method for a VMM to track and manage guest entries in a TLB according to one embodiment.

FIG. 3 is a flow diagram of an example method 300 for the VMM 110 to track and manage guest entries in the TLB 112 according to one embodiment. Method 300 may be performed by processing logic that may comprise hardware (e.g., circuitry, dedicated logic, programmable logic, microcode, etc.), software (such as operations being performed by the MCU), firmware or a combination thereof. In one embodiment, method 300 is performed by processing device 122 of FIG. 1A or FIG. 1B. For example, some or each operation may be performed by the VMM 110 executing the TLB tracking component 138. In another embodiment, the method 300 is performed by any of the processing devices described with respect to FIGS. 7-12. Alternatively, other components of the computing system 100 (or software executing on the processing device 122) may perform some or all of the operations of the method 300.

Referring to FIG. 3, the method 300 begins by the processing logic with enabling (block 302) a VM-execution control (enable EMKEPC TLB epoch exiting) on each thread (virtual processor 140 and virtual processor 145) belonging to the guest 116. In some embodiments, enabling EMKEPC TLB epoch exiting may include the VMM 110 sending a signal to the guest OS 124. The signal may cause the guest OS 124 to enable EMKEPC TLB epoch exiting on each virtual processor 140 and virtual processor 145. In another embodiment, setting EMKEPC TLB epoch exiting may include the VMM 110 sending a signal directly to virtual processor 140 and virtual processor 145 to enable EMKEPC TLB epoch exiting. For example, enabling EMKEPC TLB epoch exiting on the virtual processor 140 and 145 may include setting the valid bit in the active tracking epoch 162 and 164. EMKEPC TLB epoch exiting may include performing one or more guest TLB tracking and managing operations (e.g., comparing guest epoch values in the EMKEPC epoch 150 and the TLB tracking epoch data structure 139, checking whether the TIP bit is set, delivering a VM exit, etc.).

The processing logic may allocate (block 304) the TLB tracking epoch data structure 139 on the guest 116. In some embodiments, the TLB tracking epoch data structure 139 may include 64-bits and bits 62:0 may contain the current value of the guest epoch and bit 63 may contain the TIP bit. The VMM 110 may initialize the current value of the guest epoch to "0" in the TLB tracking epoch data structure 139.

The processing logic may set (block 306) a reference to the TLB tracking epoch data structure 142 and 147 on each virtual processor 140 and 145. For example, in one embodiment, the TLB tracking pointer 142 and 147 in each VMCS0 141 and VMCS146 may be set to point to the TLB tracking epoch data structure 139. In another embodiment, the address bits in the active tracking epoch 162 and 164 may be set to the physical address of the TLB tracking epoch data structure 139. Using the reference, the guest OS 124 may access the TLB tracking epoch data structure 139 during the EPCALLOC instruction to obtain information about the current guest epoch and when TLB tracking is in progress (e.g., the TIP bit is set).

The processing logic may handle (block 308) one or more VM exits delivered by the guest OS 124. As discussed above, the guest OS 124 may deliver VM exits when the EPCALLOC instruction is attempted and the guest epoch associated with the EPC page is the same as the current value of the guest epoch. Additionally, the guest OS 124 may deliver VM exits when the EPCALLOC instruction is attempted and the guest epoch associated with the EPC page is one less than the current value of the guest epoch and tracking is in progress (e.g., TIP bit is set).

Handling the one or more VM exits in block 308 may include determining (block 310) whether the guest epoch value associated with the EPC page in the EMKEPC epoch 150 is the same as the current value of the guest epoch and the TIP bit is clear. Upon such a determination, the processing logic may cause the VMM 110 to increment (block 312) the current value of the guest epoch and set the TIP bit in the TLB tracking epoch data structure 139. In some embodiments, the current value of the guest epoch and the TIP bit may be updated atomically. Atomic updating may enable concurrency. The processing logic may also perform (block 314) one or more TLB shoot-downs.

In response to a determination that the value of the guest epoch associated with the EPC page is one less than the current value of the guest epoch and the TIP bit is set, the processing logic may cause the VMM 110 thread to wait (block 316) until the TLB shoot-down completes (e.g., the TIP bit is cleared or the current value of the guest epoch is at least two larger than the value of the guest epoch in the EMKEPC epoch 150) or to resume (block 318) the guest 116 to retry the EPCALLOC instruction. Upon resuming the guest 116, if the guest epoch value associated with the EPC page in the EMKEPC epoch 150 is still one less than the current value of the guest epoch and the TIP is still set, then the processing logic for the EPCALLOC instruction may deliver another VM exit. In some embodiments, when the guest is resumed, the condition may be false (e.g., the guest epoch value associated with the EPC page may be one less than the current value of the guest epoch and the TIP may not be set), and the EPCALLOC instruction may proceed to allocating the target EPC page. When handling of the VM exits is completed and the VM 116 has not been resumed yet, the processing logic may resume (block 318) the VM 116 to enable the guest OS 124 to allocate the EPC page.

Figure 4:
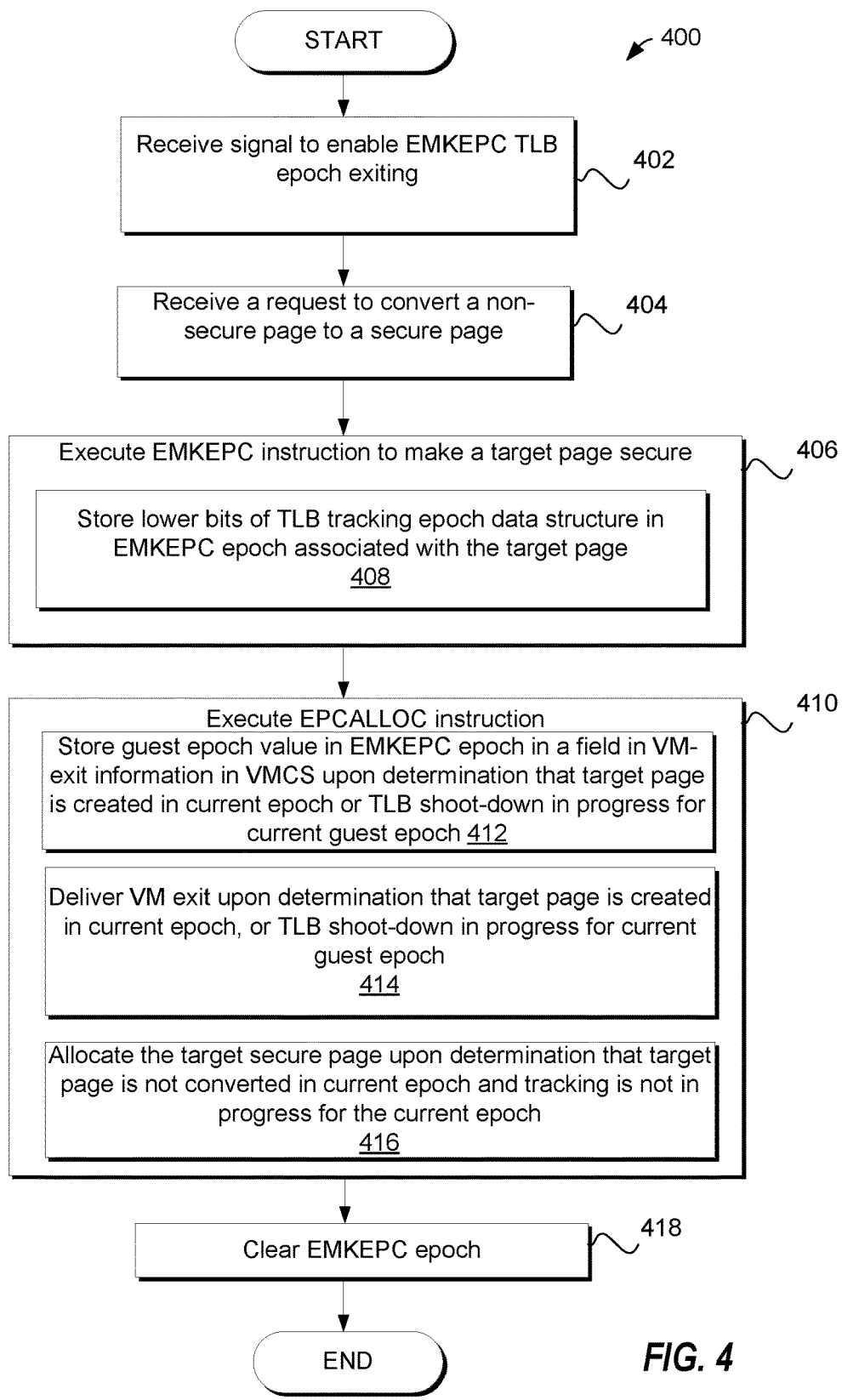
FIG. 4 is a flow diagram of an example method for a guest to track TLB entries prior to allocating secure pages according to one embodiment.

FIG. 4 is a flow diagram of an example method 400 for a guest OS 124 to track guest entries in the TLB 112 prior to allocating secure pages according to one embodiment. Method 400 may be performed by processing logic that may comprise hardware (e.g., circuitry, dedicated logic, programmable logic, microcode, etc.), software (such as operations being performed by the MCU), firmware or a combination thereof. In one embodiment, method 400 is performed by processing device 122 of FIG. 1A or FIG. 1B. For example, some or each operation may be performed by the guest OS 124 controlling the threads (e.g., virtual processor 140 and/or virtual processor 145). In another embodiment, the method 400 is performed by any of the processing devices described with respect to FIGS. 7-12. Alternatively, other components of the computing system 100 (or software executing on the processing device 122) may perform some or all of the operations of the method 400.

Referring to FIG. 4, the method 400 begins by the processing logic with receiving (block 502) a signal from the VMM 110 to enable EMKEPC TLB epoch exiting (VM-execution control) for each virtual processor 141 and virtual processor 146 of the guest 116. Enabling EMKEPC TLB epoch exiting may cause one or more operations to be performed, such as delivering one VM exit at the end of a guest epoch. The beginning of a guest epoch is marked by a first EMKEPC instruction for a page and the end of the guest epoch is marked by an attempt to execute the first EPCALLOC on one of the pages converted in that guest epoch. In other words, the guest OS 124 may batch multiple EMKEPC instructions during a guest epoch to convert multiple pages, and the guest OS 124 may deliver a single VM exit when a corresponding EPCALLOC instruction is attempted for a converted page during that guest epoch. Further, the guest OS 124 may deliver VM exits on multiple threads (virtual processors) if the guest OS 124 attempts concurrent EPCALLOC instructions via the threads on pages belonging to the same epoch. On the other hand, the guest OS 124 may not deliver a VM exit if the EPCALLOC instruction is executed on a page belonging to an older epoch when tracking is not in progress (e.g., TIP bit is not set). The guest OS 124 may deliver a VM exit if an EPCALLOC instruction is attempted on a page in an older epoch when tracking is in progress (e.g., TIP bit is set).

The processing logic may receive (block 404) a request to convert a non-secure page to a secure page. The request may be received by the guest OS 124 in response to a resource demand (e.g., memory or processing). In response to the request, the processing logic may cause the guest OS 124 to execute (block 406) the EMKEPC instruction to convert a target page from non-secure to secure. The EMKEPC instruction may also include storing (block 408) the guest epoch (lower 63 bits) of the TLB tracking epoch data structure 139 in the EMKEPC epoch 150 associated with the target page.

After the target page has been converted to a secure page, the processing logic may execute (block 410) the EPCALLOC instruction. Executing the EPCALLOC instruction may include the operations performed in blocks 412, 414, and/or 416. When the guest OS 124 executes the EPCALLOC instruction, one or more determinations may be performed (block 411) to determine whether the TLB 112 is cleared of any mappings to the secure pages prior to allocating the secure pages. One determination may include determining whether the value of the guest epoch associated with the EPC page stored in the EMKEPC epoch 150 matches the current value of the guest epoch (e.g., lower 63 bits) in the TLB tracking epoch data structure 139. If the values match, the target secure page was created in the current guest epoch. Another determination performed by the EPCALLOC instruction may include determining if a TLB shoot-down for the current guest epoch is still in progress (e.g., the value of the guest epoch associated with the EPC page in the EMKEPC epoch 150 is one less than the current value of the guest epoch and the TIP bit is set).

Responsive to a positive determination resulting from either of the determinations, the EPCALLOC instruction stores (block 412) the guest epoch value stored in the EMKEPC epoch 150 in the epoch exit field 143 and 148 in the VMCS0 141 and VMCS1 146. The processing logic may also deliver (block 414) a VM exit in response to a positive determination resulting from either determination (e.g., either condition is true). As discussed herein, in some embodiments, the VMM 110 may handle these VM exits by incrementing the current value of the guest epoch and setting the TIP bit, performing a TLB shoot-down, and clearing the TIP bit. Also, in some embodiments, the VMM 110 thread may handle these VM exits by waiting until a TLB shoot-down completes or by resuming the VM 116 to execute the EPCALLOC instruction again.

Responsive to negative determinations resulting from both determinations discussed above, the processing logic may allocate (block 416) the target secure page. That is the secure page may be allocated responsive to a determination that the target secure page is not converted in the current guest epoch and that tracking is not in progress (e.g., TIP bit is clear) for the current guest epoch. After the secure page is allocated, secure applications may access and modify the secure page and new mappings may be added to the TLB 112. It should be noted that not all of the operations in blocks 412, 414, and 416 may be performed each time the EPCALLOC instruction is executed. For example, if the guest OS 124 delivers a VM exit in block 414, then the guest OS 124 may not allocate the target secure page until control returns from the VMM 110 and the VMM 110 indicates that the TLB 112 has been cleared.

The processing logic may clear (block 418) the EMKEPC epoch 150. Clearing the EMKEPC epoch 150 may avoid conflicts during future EPCALLOC instructions. For example, an EPCFREE instruction clears the EMKEPC epoch 150 so any subsequent EPCALLOC instructions either reads "0", which may not trigger a VM exit, or the actual EMKEPC epoch, which may trigger a VM exit.

Figure 5:
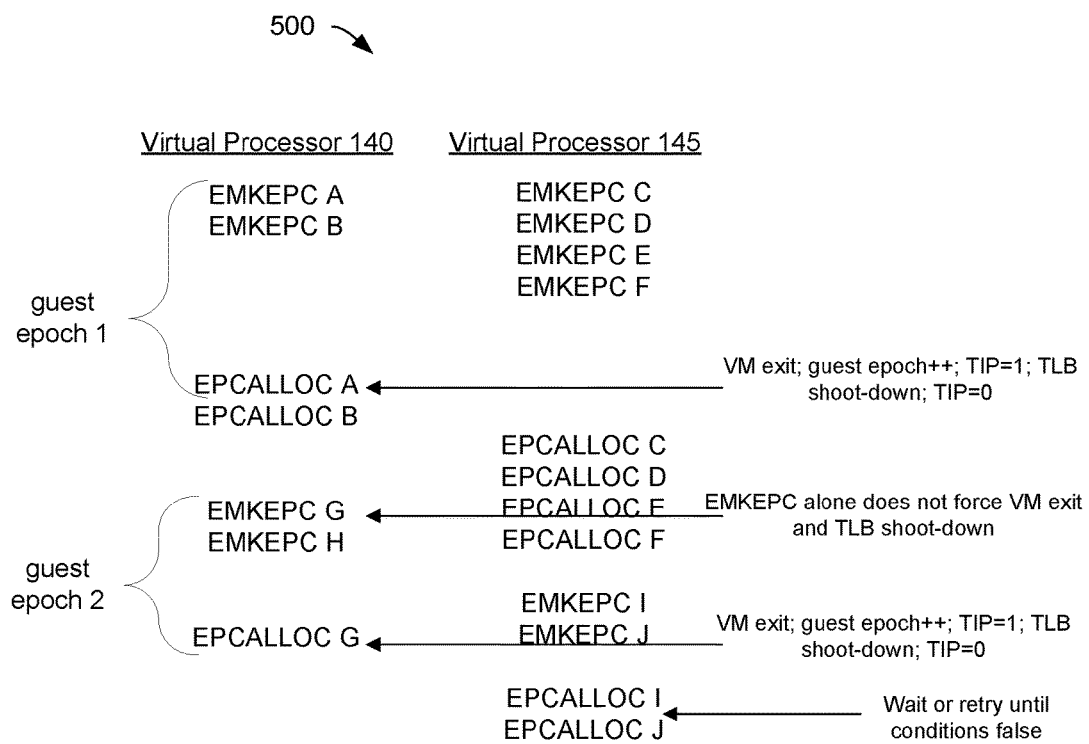
FIG. 5 is a table illustrating an example of a guest converting and allocating secure pages on two virtual processors while TLB tracking and managing is performed according to one embodiment.

FIG. 5 is a table 500 illustrating an example of a guest converting and allocating secure pages on two virtual processors (140 and 145) while TLB tracking and managing is performed according to one embodiment. Virtual processor 140 and virtual processor 145 may be threads executing on the same guest VM (e.g., VM 116). Each virtual processor 140 and virtual processor 145 may request to convert non-secure pages to secure pages. The example is intended to illustrate how guest epochs may be used by a VMM 110 and when VM exits may be delivered by the guest operating on the processing device 122. A single VM exit and TLB shoot-down is performed for each guest epoch (e.g., at EPCALLOC A and EPCALLOC G), as explained in more detail below.

As depicted in the example of FIG. 5, there are 10 pages that virtual processor 140 and virtual processor 145 are converting to secure pages: A, B, C, D, E, F, G, H, I, and J. Guest epoch 1 begins with the first EMKEPC instruction (EMKEPC A) and ends with the first EPCALLOC instruction (EPCALLOC A) for a page included in guest epoch 1. Thus, guest epoch 1 includes pages (A, B, C, D, E, F) associated with all EMKEPC instructions until the first EPCALLOC instruction (EPCALLOC A) for secure pages in guest epoch 1. Guest epoch 1 includes secure pages from EMKEPC instructions executed on both virtual processor 140 and virtual processor 145.

As shown, at the end of guest epoch 1, the EPCALLOC A instruction causes a VM exit and the VMM 110 increments guest epoch 1 to guest epoch 2, sets the TIP bit in the TLB tracking epoch data structure 139 to "1", performs a TLB shoot-down for both virtual processor 140 and virtual processor 145, and then sets the TIP bit to "0". The TLB shoot-down clears the entries from the TLB 112 used by virtual processor 140 and virtual processor 145 so there are no stale mappings to secure pages (A, B, C, D, E, F) left in the TLB 112.

Guest epoch 2 begins with the first EMKEPC instruction (EMKEPC G) after guest epoch 1 terminates. Guest epoch 2 ends with the first EPCALLOC instruction (EPCALLOC G) for a page included in guest epoch 2. Thus, guest epoch 2 includes pages (G, H, I, J) associated with all EMKEPC instructions until the first EPCALLOC instruction (EPCALLOC G) for secure pages in guest epoch 2. Guest epoch 2 includes secure pages from EMKEPC instructions executed on both virtual processor 140 and virtual processor 145. As depicted by the arrow to EMKEPC G, an EMKEPC instruction alone (e.g., without a corresponding EPCALLOC instruction for the same page) does not force a VM exit and TLB shoot-down. It is only at the end of guest epoch 2, where there is an EPCALLOC for secure page G, that causes the VM exit and the VMM 110 to increment guest epoch 2 to guest epoch 3, set the TIP bit to "1", perform the TLB shoot-down of the TLB for the virtual processor 140 and virtual processor 145, and set the TIP bit to "0".

Before each TLB shoot-down, the VMM 110 increments the guest epoch. Accordingly, the EMKEPC J instruction, for example, may store the value of the guest epoch or the increment of guest epoch in the EMKEPC epoch 150. If EMKEPC stores the value of the guest epoch, the TLB shoot-down removes any stale TLB entries to page J from the TLBs. If the EMKEPC J instruction stores the value of the incremented guest epoch value, there may be stale TLB entries with mappings to the page J that the TLB shoot-down missed. In such a case, page J is considered to belong to the next guest epoch and an attempt to execute the EPCALLOC instruction on any page in that guest epoch triggers another VM exit. Concurrent VM exits (EPCALLOC G and EPCALLOC I) may be delivered to allow the VMM 110 to complete the TLB shoot-down process (e.g., when EPCALLOC is attempted and the TIP Bit is set). In some embodiments, the VMM thread executing on the virtual processor 145 may wait until both conditions (e.g., the secure page was converted in the current guest epoch and a TLB shoot-down is in progress for the current guest epoch) are false or resume to retry the EPCALLOC instruction, which may cause more VM exits to be delivered until both EPCALLOC test conditions are false. In some embodiments, VM exits and TLB shoot-downs are not performed for EPC pages from older guest epochs. For example, the EPCALLOC E instruction and EPCALLOC F instruction do not trigger a VM exit or TLB shoot-down because a VM exit and TLB shoot-down were already performed at the EPCALLOC A instruction for a page in the same guest epoch.

Figure 6A:
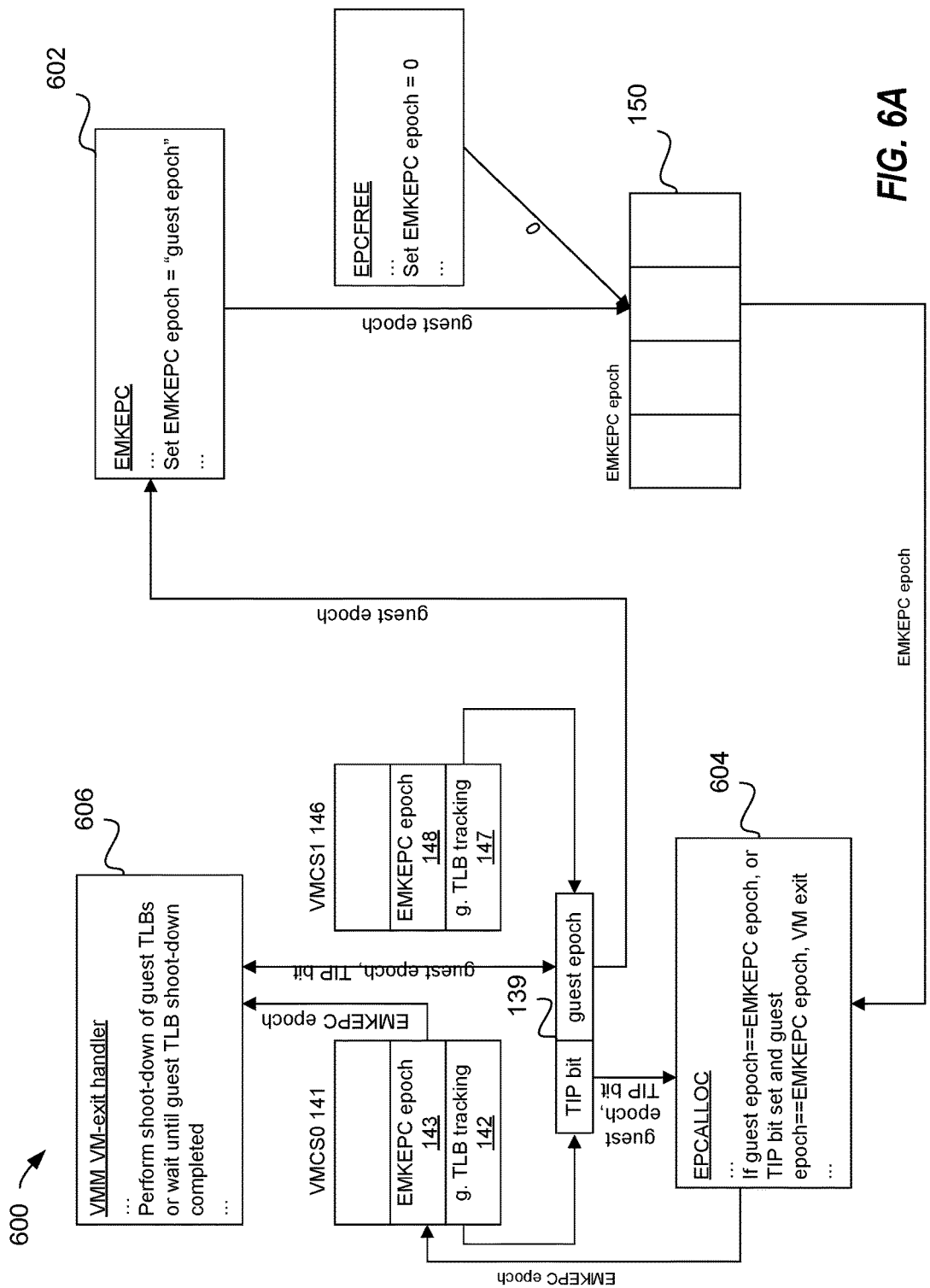
FIG. 6A is a block diagram illustrating an example method for tracking and managing guest entries in a TLB using epochs according to one embodiment.

FIG. 6A is a block diagram illustrating an example method 600 for tracking and managing guest TLB entries in a TLB 112 using guest epochs according to one embodiment. Method 600 may be performed by processing logic that may comprise hardware (e.g., circuitry, dedicated logic, programmable logic, microcode, etc.), software (such as operations being performed by the MCU), firmware or a combination thereof. In one embodiment, method 600 is performed by processing device 122 of FIG. 1A. For example, some or each operation may be performed by the VMM 110, the VM 116 (e.g., via guest OS 124), or both. In another embodiment, the method 600 is performed by any of the processing devices described with respect to FIGS. 7-12. Alternatively, other components of the computing system 100 (or software executing on the processing device 122) may perform some or all of the operations of the method 600.

Referring to FIG. 6A, the method 600 begins by the processing logic executing the VM 116 executing (block 602) the EMKEPC instruction to convert a non-secure page to a secure page. The EMKEPC instruction may set the EMKEPC epoch 150 associated with the secure page to the current value of the guest epoch retrieved from the TLB tracking epoch data structure 139. When the guest epoch is stored in the EMKEPC epoch 150 (e.g., metadata) for a secure page, the guest epoch may be associated with that secure page that is converted by the EMKEPC instruction. As such, each EPC page that is converted may be associated with a guest epoch value indicative of the time period when mappings may be made to the page.

The processing logic may cause the VM 116 to attempt to execute (block 604) the EPCALLOC instruction. As discussed above, the EPCALLOC instruction may determine whether the TLB 112 may contain stale mappings to the secure page or whether tracking of guest TLBs for a given guest epoch is still in progress. A first determination may include determining whether the EMKEPC for the secure page was performed in the current guest epoch (e.g., by comparing the value of the current value of the guest epoch in the TLB tracking epoch data structure 139 and the value of the guest epoch associated with the EPC page in the EMKEPC epoch 150), and a second determination may include determining whether tracking is in progress in the current guest epoch (e.g., by checking whether the TIP bit is set in the TLB tracking epoch data structure 139 and the value of the guest epoch associated with the EPC page is one less than the current value of the guest epoch). As such, the EPCALLOC instruction may access the TLB tracking epoch data structure 139 (allocated by the VMM 110) via the VMCS 141, 146 maintained for each virtual processor of the VM 116. The VMCS 141, 146 may include a TLB tracking pointer 142 and 147, which the EPCALLOC instruction may utilize to retrieve the information about the guest epoch and the TIP bit. If the determination is made that either condition is true, the EPCALLOC instruction stores the value of EMKEPC epoch in an epoch exit field 143 and 148 in the VMCS0 141 and VMCS1 146 and delivers a VM exit.

The VMM 110 may receive the value of the EMKEPC epoch in the data in the epoch exit field 143 and 148 of the VMCS 141, 146 when the VM exit is delivered, and the VMM 110 may handle (block 606) the VM exit. In some embodiments, the VMM 110 may handle the VM exit by testing if the guest epoch value provided from the epoch exit field 143 and 148 of the VMCS 141, 146 is the same as the current value of guest epoch in the TLB tracking epoch data structure 139 and if the TIP bit is clear. If both conditions are true, the VMM 110 increments the current value of the guest epoch in the TLB tracking epoch data structure 139, sets the TIP bit to "1" in the TLB tracking epoch data structure 139, and performs a TLB shoot-down. In some embodiments, this test-and-set operation is atomic. If a determination is made that the guest epoch value in the EMKEPC epoch 150 is one less than the current value of the guest epoch and the TIP bit is set (e.g., a TLB shoot-down is currently in progress for the current guest epoch), then the VMM 110 may wait until either the TIP bit is cleared or the current value of the guest epoch is larger than the value of the guest epoch value deposited in the EMKEPC epoch 150 plus one, or the VMM 110 may resume the guest 116 to retry the EPCALLOC instruction.

In some embodiments, when the VM 116 is not yet resumed, the current value of the guest epoch is incremented, the TLB shoot-downs are completed, and the TIP bit is clear, the VMM 110 may resume the VM attempting the EPCALLOC and the virtual processor of that VM may execute the EPCALLOC to allocate the secure page. The processing logic may execute (block 608) the EPCFREE instruction to clear the EMKEPC epoch 150 (e.g., set it to "0") when the EPC page is no longer used by an application.

Figure 6B:
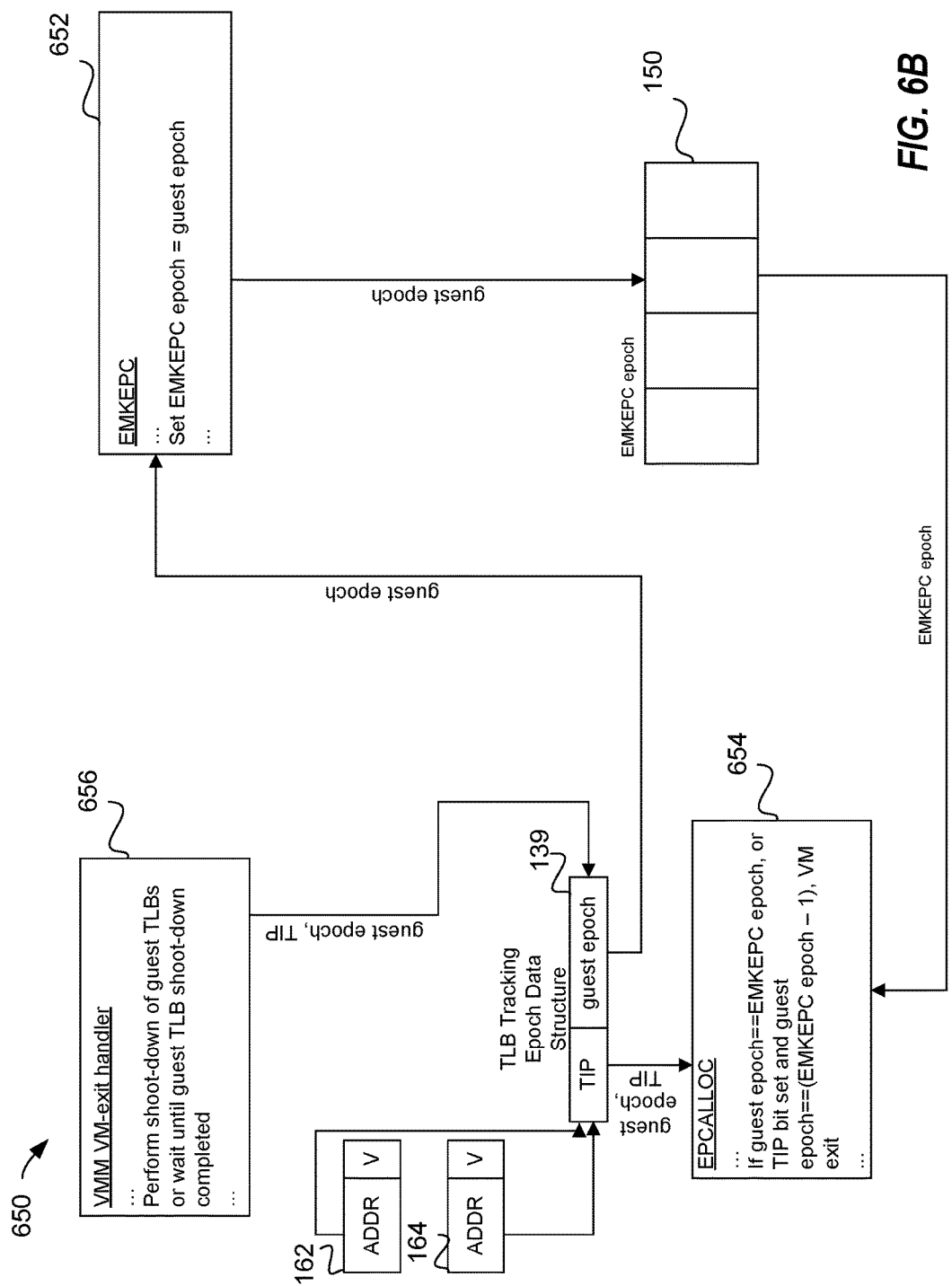
FIG. 6B is a block diagram illustrating another example method for tracking and managing guest entries in a TLB using epochs according to one embodiment.

FIG. 6B is a block diagram illustrating another example method 650 for tracking and managing guest entries in a TLB using epochs according to one embodiment. Method 650 may be performed by processing logic that may comprise hardware (e.g., circuitry, dedicated logic, programmable logic, microcode, etc.), software (such as operations being performed by the MCU), firmware or a combination thereof. In one embodiment, method 650 is performed by processing device 122 of FIG. 1B. For example, some or each operation may be performed by the VMM 110, the VM 116 (e.g., via guest OS 124), or both. In another embodiment, the method 650 is performed by any of the processing devices described with respect to FIGS. 7-12. Alternatively, other components of the computing system 160 (or software executing on the processing device 122) may perform some or all of the operations of the method 650.

Referring to FIG. 6B, the method 650 begins by the processing logic executing the VM 116 executing (block 652) the EMKEPC instruction to convert a non-secure page to a secure page. The EMKEPC instruction may set the EMKEPC epoch 150 associated with the secure page to the current value of the guest epoch retrieved from the TLB tracking epoch data structure 139. When the guest epoch is stored in the EMKEPC epoch 150 (e.g., metadata) for a secure page, the guest epoch may be associated with that secure page that is converted by the EMKEPC instruction. As such, each EPC page that is converted may be associated with a guest epoch value indicative of the time period when mappings may be made to the page.

The processing logic may cause the VM 116 to attempt to execute (block 654) the EPCALLOC instruction. As discussed above, the EPCALLOC instruction may perform various determinations to determine whether the TLB 112 may contain stale mappings to the secure page or whether tracking of guest TLB s for a given guest epoch is still in progress. A first test may include determining whether the EMKEPC for the secure page was performed in the current guest epoch (e.g., by comparing the value of the current value of the guest epoch in the TLB tracking epoch data structure 139 and the value of the guest epoch associated with the EPC page in the EMKEPC epoch 150). A second test performed by the EPCALLOC instruction may include determining whether tracking is in progress in the current guest epoch (e.g., by checking whether the TIP bit is set in the TLB tracking epoch data structure 139 and the value of the guest epoch associated with the EPC page is one less than the current value of the guest epoch). As such, the EPCALLOC instruction may access the TLB tracking epoch data structure 139 (allocated by the VMM 110) via the address stored in the active tracking epoch 162 and 164. As discussed above, the address to the TLB tracking epoch data structure 139 is stored in the address bits of the active tracking epoch 162 and 164 by the VMM 110. The EPCALLOC instruction may utilize the address in the active tracking epoch 162 and 164 to retrieve the information about the guest epoch and the TIP bit. If the determination is made that either condition is true, the EPCALLOC instruction stores the value of EMKEPC epoch in an epoch exit field 143 and 148 in the VMCS0 141 and VMCS1 146 and delivers a VM exit.

The VMM 110 may receive control when the VM exit is delivered, and the VMM 110 may handle (block 606) the VM exit. In some embodiments, the VMM 110 may handle the VM exit by testing if the guest epoch value provided from the epoch exit field 143 and 148 of the VMCS 141, 146 is the same as the current value of guest epoch in the TLB tracking epoch data structure 139 and if the TIP bit is clear. If both conditions are true, the VMM 110 increments the current value of the guest epoch in the TLB tracking epoch data structure 139, sets the TIP bit to "1" in the TLB tracking epoch data structure 139, and performs a TLB shoot-down. In some embodiments, this test-and-set operation is atomic. If it is determined that the guest epoch value in the EMKEPC epoch 150 is one less than the current value of the guest epoch and the TIP bit is set (e.g., a TLB shoot-down is currently in progress for the current guest epoch), then the VMM 110 may wait until either the TIP bit is cleared or the current value of the guest epoch is larger than the guest epoch value deposited in the EMKEPC epoch 150 plus one or the VMM 110 may resume the guest 116 to retry the EPCALLOC instruction. In some embodiments, when the VM 116 is not yet resumed, the current value of the guest epoch is incremented, the TLB shoot-downs are completed, and the TIP bit is clear, the VMM 110 may resume the VM attempting the EPCALLOC and the virtual processor of that VM may execute the EPCALLOC to allocate the secure page.

Figure 7A:
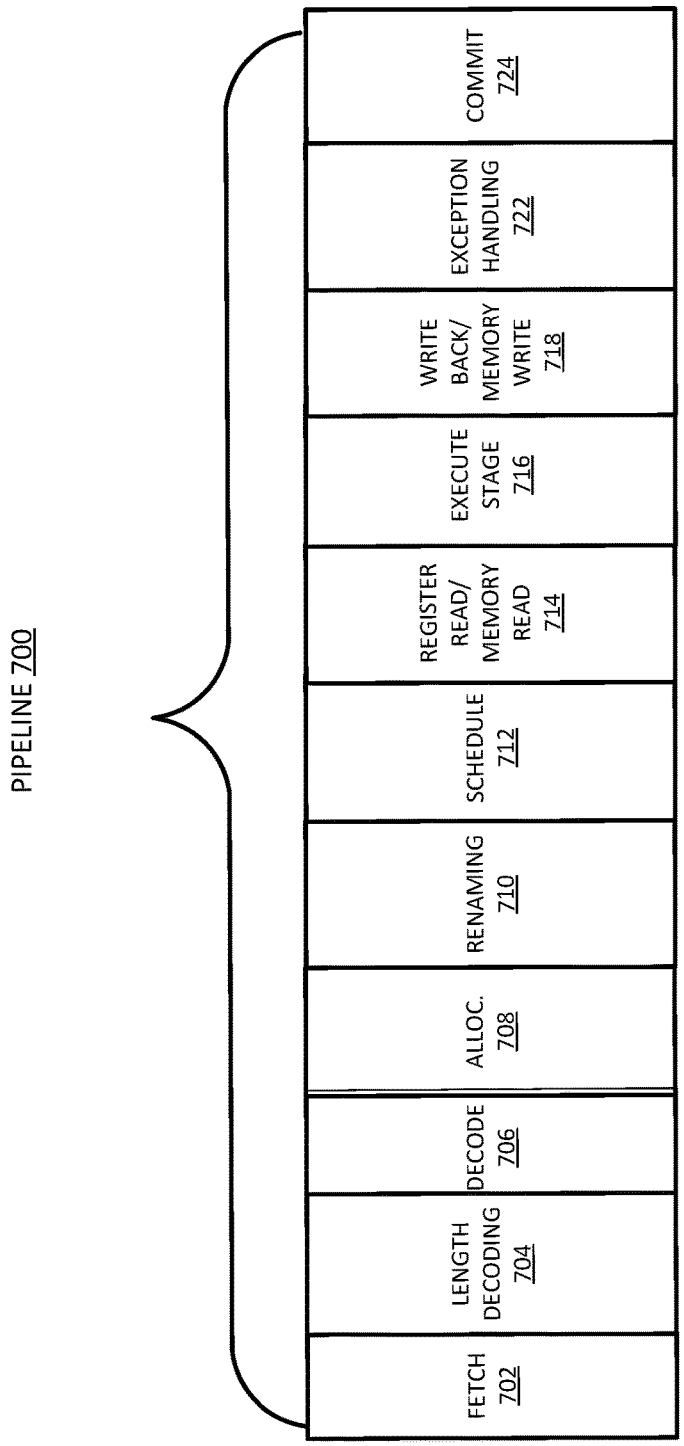
FIG. 7A is a block diagram illustrating a micro-architecture for a processor in which one implementation of the disclosure may be used.
Figure 7B:
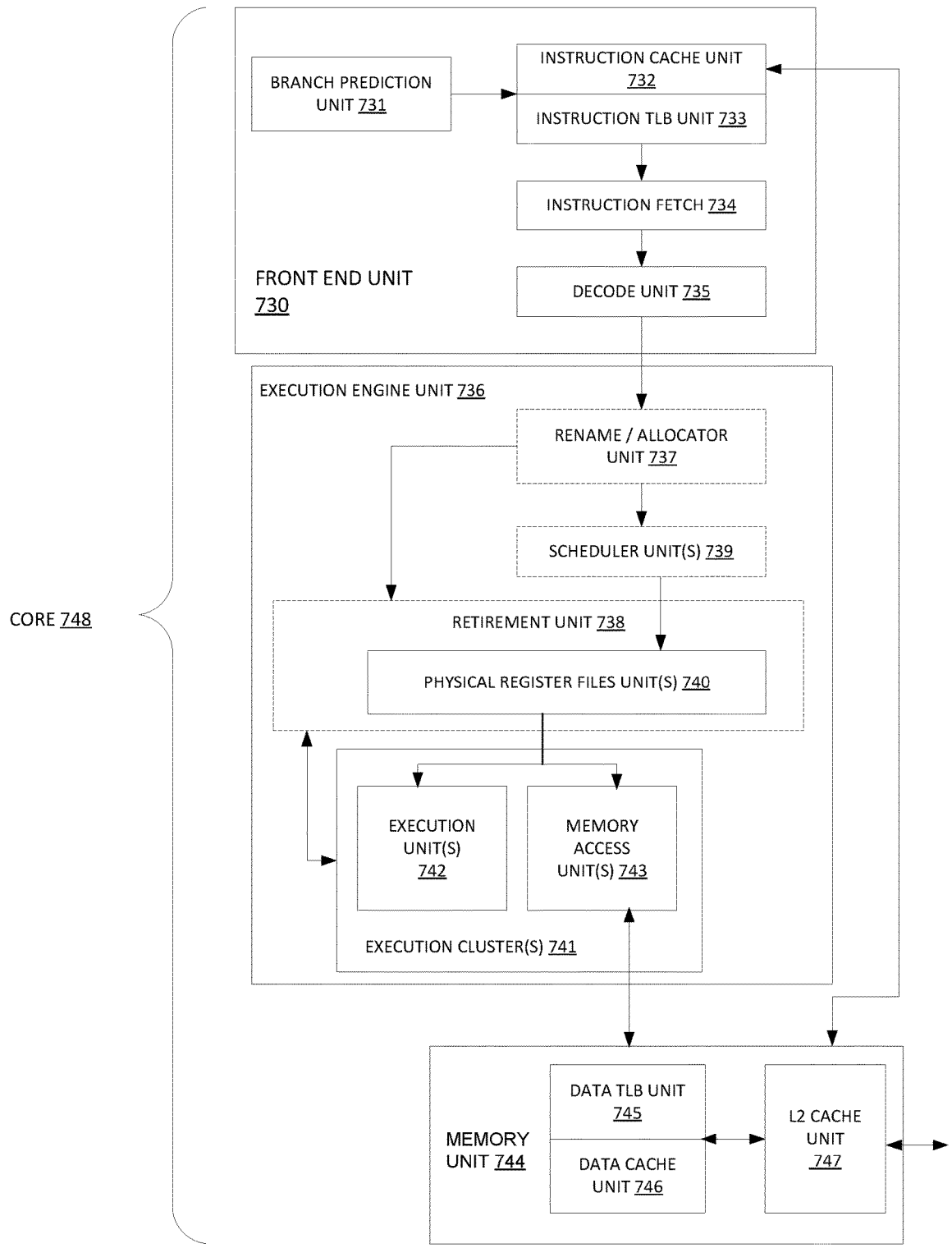
FIG. 7B is a block diagram illustrating an in-order pipeline and a register renaming stage, out-of-order issue/execution pipeline implemented according to at least one implementation of the disclosure.

FIG. 7A is a block diagram illustrating an in-order pipeline and a register re-naming stage, out-of-order issue/execution pipeline of a processor tracking and managing a TLB according to at least one implementation of the disclosure. FIG. 7B is a block diagram illustrating an in-order architecture core and a register renaming logic, out-of-order issue/execution logic to be included in a processor according to at least one implementation of the disclosure. The solid lined boxes in FIG. 7A illustrate the in-order pipeline, while the dashed lined boxes illustrates the register renaming, out-of-order issue/execution pipeline. Similarly, the solid lined boxes in FIG. 7B illustrate the in-order architecture logic, while the dashed lined boxes illustrates the register renaming logic and out-of-order issue/execution logic.

In FIG. 7A, a processor pipeline 700 includes a fetch stage 702, a length decode stage 704, a decode stage 706, an allocation stage 708, a renaming stage 710, a scheduling (also known as a dispatch or issue) schedule stage 712, a register read/memory read stage 714, an execute stage 716, a write back/memory write stage 718, an exception handling stage 722, and a commit stage 724. In some implementations, the stages are provided in a different order and different stages may be considered in-order and out-of-order.

In FIG. 7B, arrows denote a coupling between two or more units and the direction of the arrow indicates a direction of data flow between those units. FIG. 7B shows processor core (core) 748 including a front end unit 730 coupled to an execution engine unit 736, and both are coupled to a memory unit 744.

The core 748 may be a reduced instruction set computing (RISC) core, a complex instruction set computing (CISC) core, a very long instruction word (VLIW) core, or a hybrid or alternative core type. As yet another option, the core 748 may be a special-purpose core, such as, for example, a network or communication core, compression engine, graphics core, or the like.

The front end unit 730 includes a branch prediction unit 731 coupled to an instruction cache unit 732, which is coupled to an instruction translation lookaside buffer (TLB) 733, which is coupled to an instruction fetch unit 734, which is coupled to a decode unit 735. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 732 is further coupled to a level 2 (L2) cache unit 747 in the memory unit 744. The decode unit 735 is coupled to a rename/allocator unit 737 in the execution engine unit 736.

The execution engine unit 736 includes the rename/allocator unit 737 coupled to a retirement unit 738 and a set of one or more scheduler unit(s) 739. The scheduler unit(s) 739 represents any number of different schedulers, including reservations stations, central instruction window, etc. The scheduler unit(s) 739 is coupled to the physical register file(s) unit(s) 740. Each of the physical register file(s) units 740 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 740 is overlapped by the retirement unit 738 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 738 and the physical register file(s) unit(s) 740 are coupled to the execution cluster(s) 741. The execution cluster(s) 741 includes a set of one or more execution units 742 and a set of one or more memory access units 743. The execution units 742 may perform various operations (e.g., shifts, addition, subtraction, multiplication) and on various types of data (e.g., scalar floating point, packed integer, packed floating point, vector integer, vector floating point).

While some implementations may include a number of execution units dedicated to specific functions or sets of functions, other implementations may include one execution unit or multiple execution units that all perform all functions. The scheduler unit(s) 739, physical register file(s) unit(s) 740, and execution cluster(s) 741 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain implementations are implemented in which the execution cluster of this pipeline has the memory access unit(s) 743). It should also be understood that where separate pipelines are used, one or more of these pipelines may be out-of-order issue/execution and the rest in-order.

The set of memory access units 743 is coupled to the memory unit 744, which includes a data TLB unit 745 coupled to a data cache unit 746 coupled to a level 2 (L2) cache unit 747. In one exemplary implementation, the memory access units 743 may include a load unit, a store address unit, and a store data unit, each of which is coupled to the data TLB unit 745 in the memory unit 744. The L2 cache unit 747 is coupled to one or more other levels of cache and eventually to a main memory.

By way of example, the exemplary register renaming, out-of-order issue/execution core architecture may implement the pipeline 700 of FIG. 7A as follows: 1) the instruction fetch 38 performs the fetch and length decoding stages 702 and 704 respectively; 2) the decode unit 735 performs the decode stage 706; 3) the rename/allocator unit 737 performs the allocation stage 708 and renaming stage 710; 4) the scheduler unit(s) 739 performs the schedule stage 712; 5) the physical register file(s) unit(s) 740 and the memory unit 744 perform the register read/memory read stage 714; the execution cluster 741 perform the execute stage 716; 6) the memory unit 744 and the physical register file(s) unit(s) 740 perform the write back/memory write stage 718; 7) various units may be involved in the exception handling stage 722) the retirement unit 738 and the physical register file(s) unit(s) 740 perform the commit stage 724.

The core 748 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in-order architecture. While the illustrated implementation of the processor also includes a separate instruction and data cache units 732/746 and a shared L2 cache unit 747, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

Figure 8:
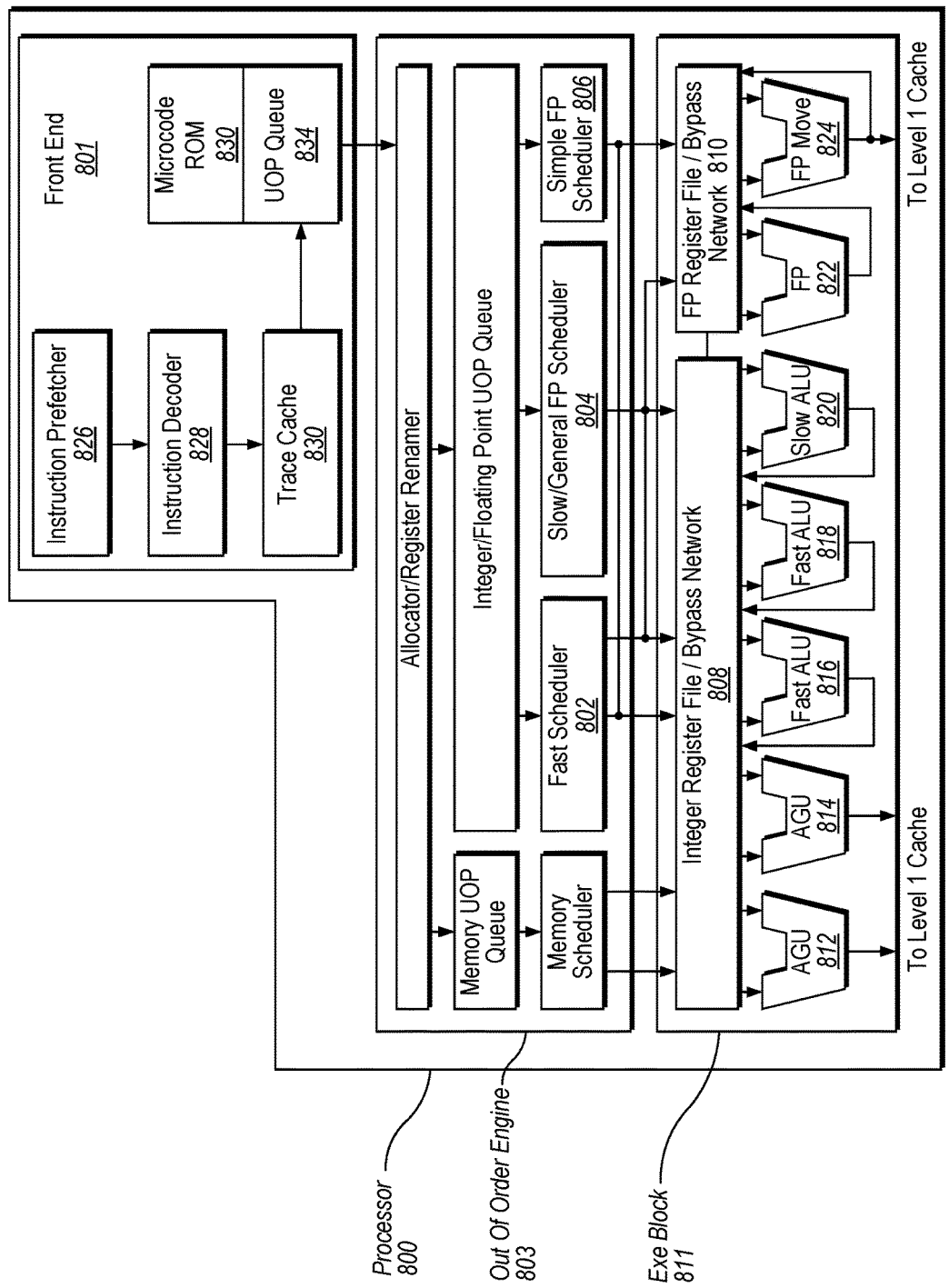
FIG. 8 illustrates a block diagram of the micro-architecture for a processing device that includes logic circuits to perform secure memory repartitioning according to one embodiment.

FIG. 8 illustrates a block diagram of the micro-architecture for a processing device 800 that includes logic circuits to track and manage a TLB according to one implementation. In some implementations, an instruction can be implemented to operate on data elements having sizes of byte, word, doubleword, quadword, etc., as well as datatypes, such as single and double precision integer and floating point datatypes. In one implementation the in-order front end 801 is the part of the processing device 800 that fetches instructions to be executed and prepares them to be used later in the processing device pipeline. The embodiments of the TLB tracking and managing can be implemented in processing device 800.

The front end 801 may include several units. In one implementation, the instruction prefetcher 816 fetches instructions from memory and feeds them to an instruction decoder 818 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 830 takes decoded uops and assembles them into program ordered sequences or traces in the uop queue 834 for execution. When the trace cache 830 encounters a complex instruction, the microcode ROM 832 provides the uops needed to complete the operation.

Some instructions are converted into a single micro-op, whereas others need several micro-ops to complete the full operation. In one implementation, if more than four micro-ops are needed to complete an instruction, the decoder 818 accesses the microcode ROM 832 to do the instruction. For one implementation, an instruction can be decoded into a small number of micro ops for processing at the instruction decoder 818. In another implementation, an instruction can be stored within the microcode ROM 832 should a number of micro-ops be needed to accomplish the operation. The trace cache 830 refers to an entry point programmable logic array (PLA) to determine a correct micro-instruction pointer for reading the micro-code sequences to complete one or more instructions in accordance with one implementation from the micro-code ROM 832. After the microcode ROM 832 finishes sequencing micro-ops for an instruction, the front end 801 of the machine resumes fetching micro-ops from the trace cache 830.

The out-of-order execution engine 803 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 802, slow/general floating point scheduler 804, and simple floating point scheduler 806. The uop schedulers 802, 804, 806, determine when a uop is ready to execute based on the readiness of their dependent input register operand sources and the availability of the execution resources the uops need to complete their operation. The fast scheduler 802 of one implementation can schedule on each half of the main clock cycle while the other schedulers can only schedule once per main processing device clock cycle. The schedulers arbitrate for the dispatch ports to schedule uops for execution.

Register files 808, 810, sit between the schedulers 802, 804, 806, and the execution units 812, 814, 816, 818, 810, 812, 814 in the execution block 811. There is a separate register file 808, 810, for integer and floating point operations, respectively. Each register file 808, 810, of one implementation also includes a bypass network that can bypass or forward just completed results that have not yet been written into the register file to new dependent uops. The integer register file 808 and the floating point register file 810 are also capable of communicating data with the other. For one implementation, the integer register file 808 is split into two separate register files, one register file for the low order 32 bits of data and a second register file for the high order 32 bits of data. The floating point register file 810 of one implementation has 128 bit wide entries because floating point instructions typically have operands from 64 to 128 bits in width.

The execution block 811 contains the execution units 812, 814, 816, 818, 810, 812, 814, where the instructions are actually executed. This section includes the register files 808, 810, that store the integer and floating point data operand values that the micro-instructions need to execute. The processing device 800 of one implementation is comprised of a number of execution units: address generation unit (AGU) 812, AGU 814, fast ALU 816, fast ALU 818, slow ALU 810, floating point ALU 812, floating point move unit 814. For one implementation, the floating point execution blocks 812, 814, execute floating point, MMX, SIMD, and SSE, or other operations. The floating point ALU 812 of one implementation includes a 64 bit by 64 bit floating point divider to execute divide, square root, and remainder micro-ops. For implementations of the disclosure, instructions involving a floating point value may be handled with the floating point hardware.

In one implementation, the ALU operations go to the high-speed ALU execution units 816, 818. The fast ALUs 816, 818, of one implementation can execute fast operations with an effective latency of half a clock cycle. For one implementation, most complex integer operations go to the slow ALU 810 as the slow ALU 810 includes integer execution hardware for long latency type of operations, such as a multiplier, shifts, flag logic, and branch processing. Memory load/store operations are executed by the AGUs 812, 814. For one implementation, the integer ALUs 816, 818, 810, are described in the context of performing integer operations on 64 bit data operands. In alternative implementations, the ALUs 816, 818, 810, can be implemented to support a variety of data bits including 16, 32, 128, 256, etc.

Similarly, the floating point units 812, 814, can be implemented to support a range of operands having bits of various widths. For one implementation, the floating point units 812, 814, can operate on 128 bits wide packed data operands in conjunction with SIMD and multimedia instructions.

In one implementation, the uops schedulers 802, 804, 806, dispatch dependent operations before the parent load has finished executing. As uops are speculatively scheduled and executed in processing device 800, the processing device 800 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processing device are also designed to catch instruction sequences for text string comparison operations.

The processing device 800 also includes logic to track and manage the TLB according to one implementation. In one implementation, the execution block 811 of processing device 800 may track and manage the TLB, according to the description herein.

The term "registers" may refer to the on-board processing device storage locations that are used as part of instructions to identify operands. In other words, registers may be those that are usable from the outside of the processing device (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processing device using any number of different techniques, such as dedicated physical registers, dynamically allocated physical registers using register renaming, combinations of dedicated and dynamically allocated physical registers, etc. In one implementation, integer registers store thirty-two bit integer data. A register file of one implementation also contains eight multimedia SIMD registers for packed data.

For the discussions herein, the registers are understood to be data registers designed to hold packed data, such as 64 bits wide MMX™ registers (also referred to as 'mm' registers in some instances) in microprocessing devices enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register file or different register files. Furthermore, in one implementation, floating point and integer data may be stored in different registers or the same registers.

Figure 9:
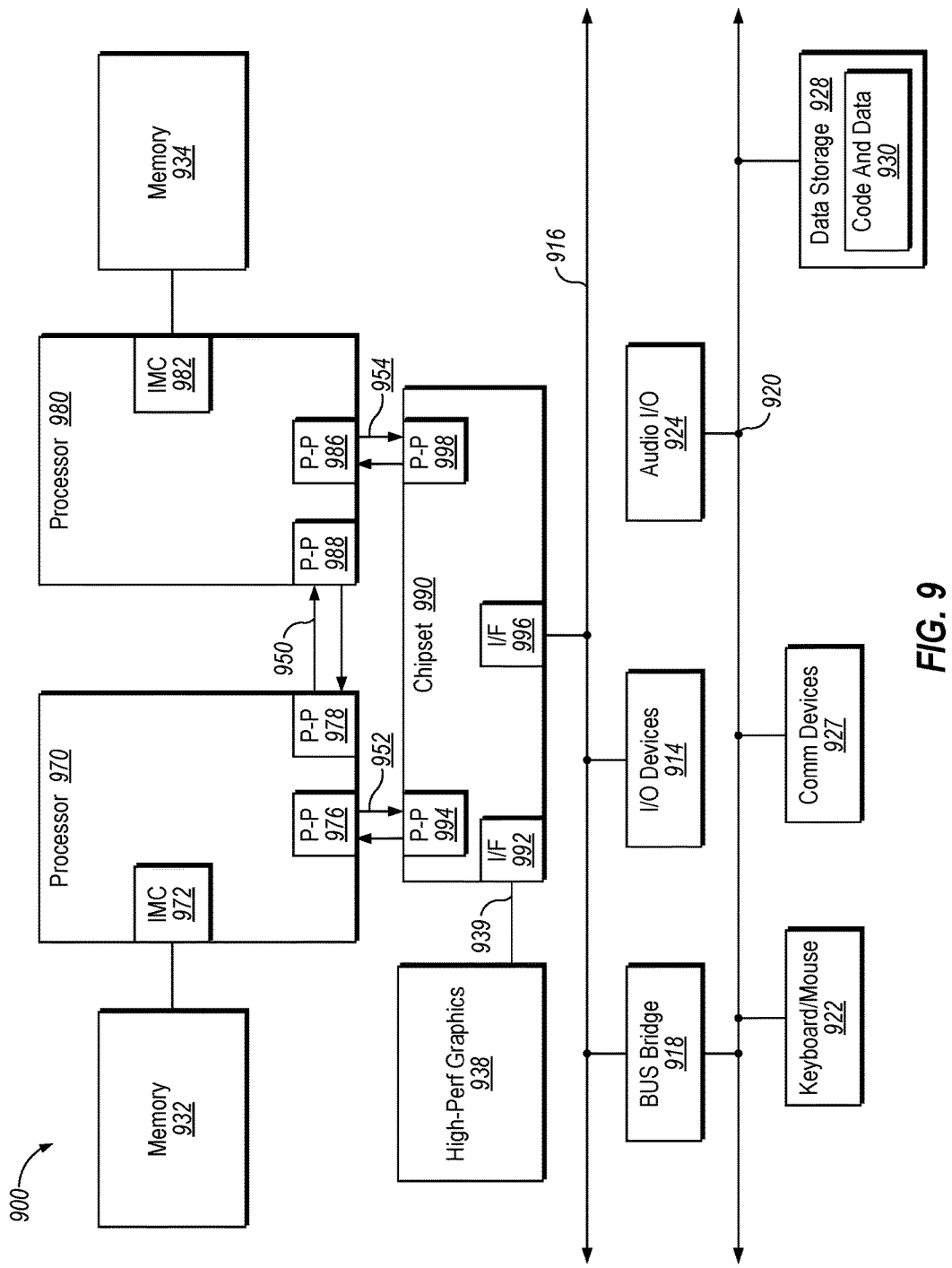
FIG. 9 is a block diagram of a computer system according to one implementation.

Embodiments may be implemented in many different system types. Referring now to FIG. 9, shown is a block diagram of a multiprocessing device system 900 in accordance with an implementation. As shown in FIG. 9, multiprocessing device system 900 is a point-to-point interconnect system, and includes a first processing device 970 and a second processing device 980 coupled via a point-to-point interconnect 950. As shown in FIG. 9, each of processing devices 970 and 980 may be multicore processing devices, including first and second processing device cores (not shown), although potentially many more cores may be present in the processing devices. The processing devices each may include hybrid write mode logics in accordance with an implementation of the present. The implementations of the tracking and managing the TLB can be implemented in the processing device 970, processing device 980, or both.

While shown with two processing devices 970, 980, it is to be understood that the scope of the disclosure is not so limited. In other implementations, one or more additional processing devices may be present in a given processing device.

Processing devices 970 and 980 are shown including integrated memory controller units 972 and 982, respectively. Processing device 970 also includes as part of its bus controller units point-to-point (P-P) interfaces 976 and 978; similarly, second processing device 980 includes P-P interfaces 986 and 988. Processing devices 970, 980 may exchange information via a point-to-point (P-P) interface 950 using P-P interface circuits 978, 988. As shown in FIG. 9, IMCs 972 and 982 couple the processing devices to respective memories, namely a memory 932 and a memory 934, which may be portions of main memory locally attached to the respective processing devices.

Processing devices 970, 980 may each exchange information with a chipset 990 via individual P-P interfaces 952, 954 using point to point interface circuits 976, 994, 986, 998. Chipset 990 may also exchange information with a high-performance graphics circuit 938 via a high-performance graphics interface 939.

A shared cache (not shown) may be included in either processing device or outside of both processing devices, yet connected with the processing devices via P-P interconnect, such that either or both processing devices' local cache information may be stored in the shared cache if a processing device is placed into a low power mode.

Chipset 990 may be coupled to a first bus 916 via an interface 996. In one implementation, first bus 916 may be a Peripheral Component Interconnect (PCI) bus, or a bus such as a PCI Express bus or another third generation I/O interconnect bus, although the scope of the disclosure is not so limited.

As shown in FIG. 9, various I/O devices 914 may be coupled to first bus 916, along with a bus bridge 918 which couples first bus 916 to a second bus 920. In one implementation, second bus 920 may be a low pin count (LPC) bus. Various devices may be coupled to second bus 920 including, for example, a keyboard and/or mouse 922, communication devices 927 and a storage unit 928 such as a disk drive or other mass storage device which may include instructions/code and data 930, in one implementation. Further, an audio I/O 924 may be coupled to second bus 920. Note that other architectures are possible. For example, instead of the point-to-point architecture of FIG. 9, a system may implement a multi-drop bus or other such architecture.

Figure 10:
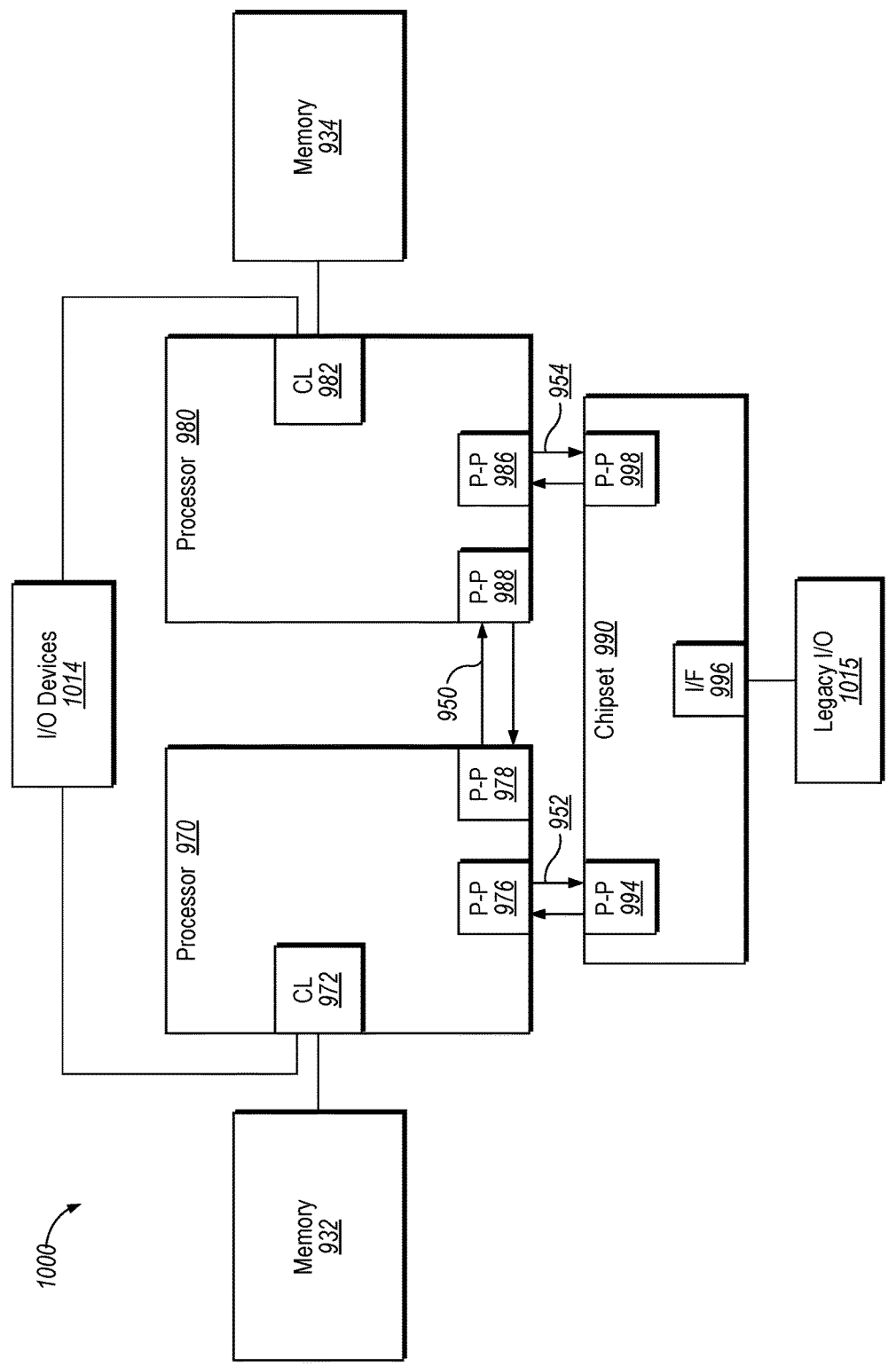
FIG. 10 is a block diagram of a computer system according to another implementation.

Referring now to FIG. 10, shown is a block diagram of a third system 1000 in accordance with an implementation of the disclosure. Like elements in FIGS. 9 and 10 bear like reference numerals, and certain aspects of FIG. 9 have been omitted from FIG. 10 in order to avoid obscuring other aspects of FIG. 10.

FIG. 10 illustrates that the processing devices 970, 980 may include integrated memory and I/O control logic ("CL") 972 and 982, respectively. For at least one implementation, the CL 972, 982 may include integrated memory controller units such as described herein. In addition, CL 972, 982 may also include I/O control logic. FIG. 9 illustrates that the memories 932, 934 are coupled to the CL 972, 982, and that I/O devices 1014 are also coupled to the control logic 972, 982. Legacy I/O devices 1015 are coupled to the chipset 990. The implementations of the tracking and managing the TLB can be implemented in processing device 970, processing device 980, or both.

Figure 11:
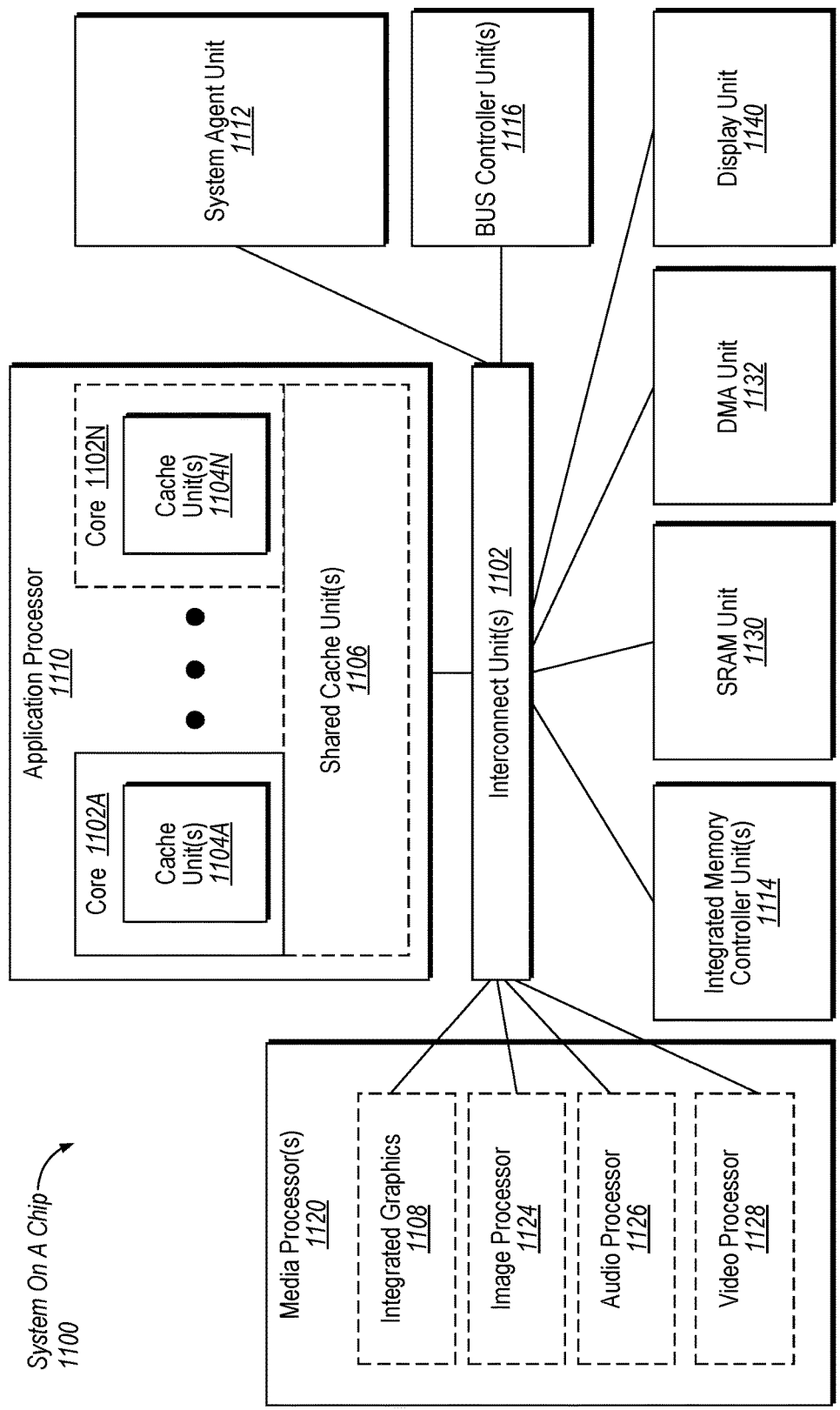
FIG. 11 is a block diagram of a system-on-a-chip according to one implementation.

FIG. 11 is an example system on a chip (SoC) that may include one or more of the cores 1102. Other system designs and configurations known in the arts for laptops, desktops, handheld PCs, personal digital assistants, engineering workstations, servers, network devices, network hubs, switches, embedded processing devices, digital signal processing devices (DSPs), graphics devices, video game devices, set-top boxes, micro controllers, cell phones, portable media players, hand held devices, and various other electronic devices, are also suitable. In general, a huge variety of systems or electronic devices capable of incorporating a processing device and/or other execution logic as disclosed herein are generally suitable.

Referring now to FIG. 11, shown is a block diagram of a SoC 1100 in accordance with an implementation of the disclosure. Also, dashed lined boxes are features on more advanced SoCs. In FIG. 11, an interconnect unit(s) 1102 is coupled to: an application processing device 1110 which includes a set of one or more cores 1102A-N and shared cache unit(s) 1106; a system agent unit 1112; a bus controller unit(s) 1116; an integrated memory controller unit(s) 1114; a set or one or more media processing devices 1120 which may include integrated graphics logic 1108, an image processing device 1124 for providing still and/or video camera functionality, an audio processing device 1126 for providing hardware audio acceleration, and a video processing device 1128 for providing video encode/decode acceleration; a static random access memory (SRAM) unit 1130; a direct memory access (DMA) unit 1132; and a display unit 1140 for coupling to one or more external displays. The implementations of the tracking and managing the TLB can be implemented in SoC 1100.

Figure 12:
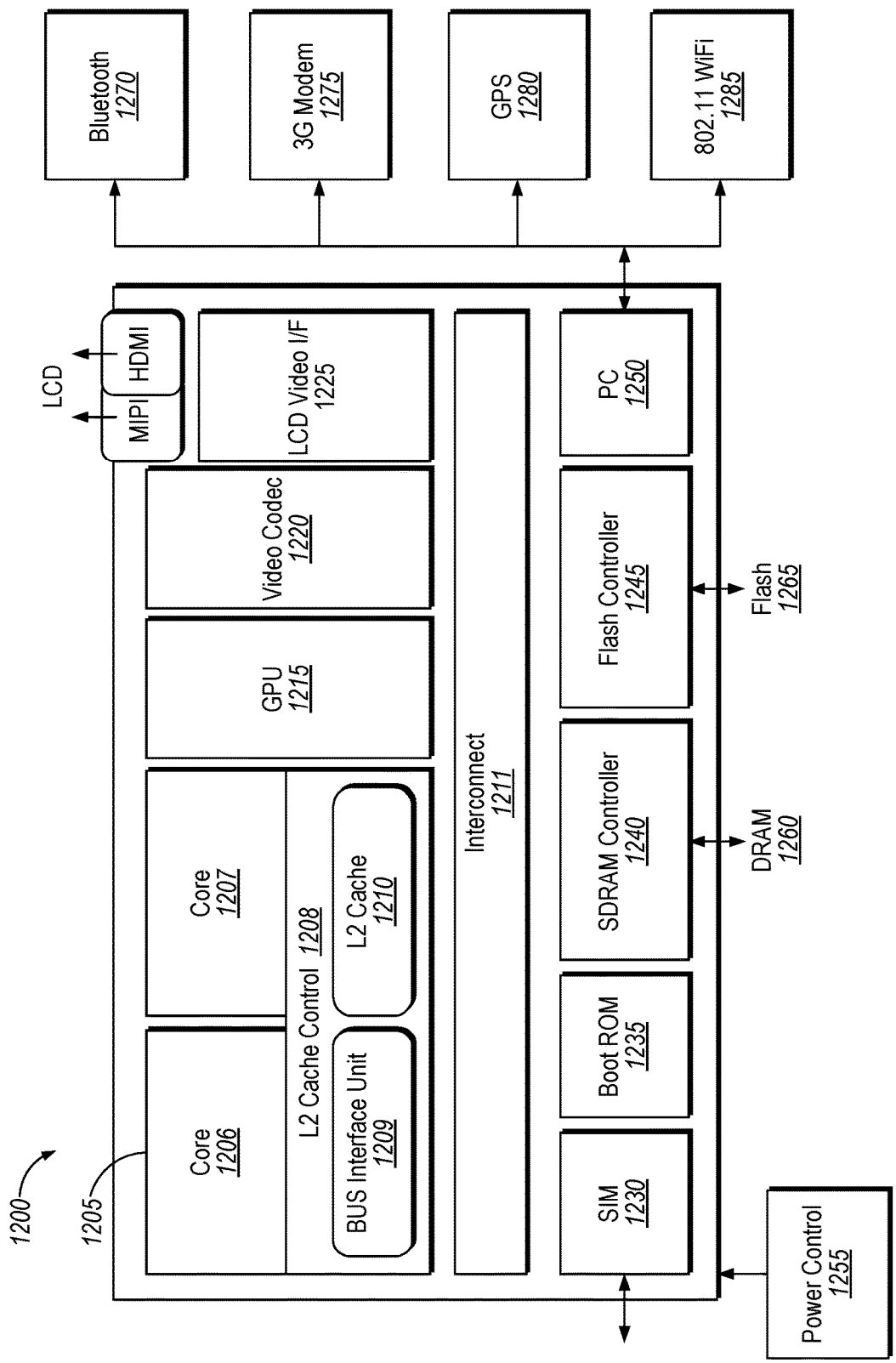
FIG. 12 illustrates another implementation of a block diagram for a computing system.

Turning next to FIG. 12, an implementation of an SoC design in accordance with implementations of the disclosure is depicted. As an illustrative example, SoC 1200 is included in user equipment (UE). In one implementation, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The implementations of the tracking and managing the TLB can be implemented in SoC 1200.

Here, SoC 1220 includes 2 cores—1206 and 1207. Similar to the discussion above, cores 1206 and 1207 may conform to an Instruction Set Architecture, such as a processing device having the Intel® Architecture Core™, an Advanced Micro Devices, Inc. (AMD) processing device, a MIPS-based processing device, an ARM-based processing device design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1211 includes an on-chip interconnect, such as an IOSF, AMBA, or other interconnects discussed above, which can implement one or more aspects of the described disclosure.

Interconnect 1211 provides communication channels to the other components, such as a Subscriber Identity Module (SIM) 1230 to interface with a SIM card, a boot ROM 1235 to hold boot code for execution by cores 1206 and 1207 to initialize and boot SoC 1200, a SDRAM controller 1240 to interface with external memory (e.g. DRAM 1260), a flash controller 1245 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the implementations described herein.

In addition, the system illustrates peripherals for communication, such as a Bluetooth module 1270, 3G modem 1275, GPS 1280, and Wi-Fi 1285. Note as stated above, a UE includes a radio for communication. As a result, these peripheral communication modules may not all be included. However, in a UE some form of a radio for external communication should be included.

Figure 13:
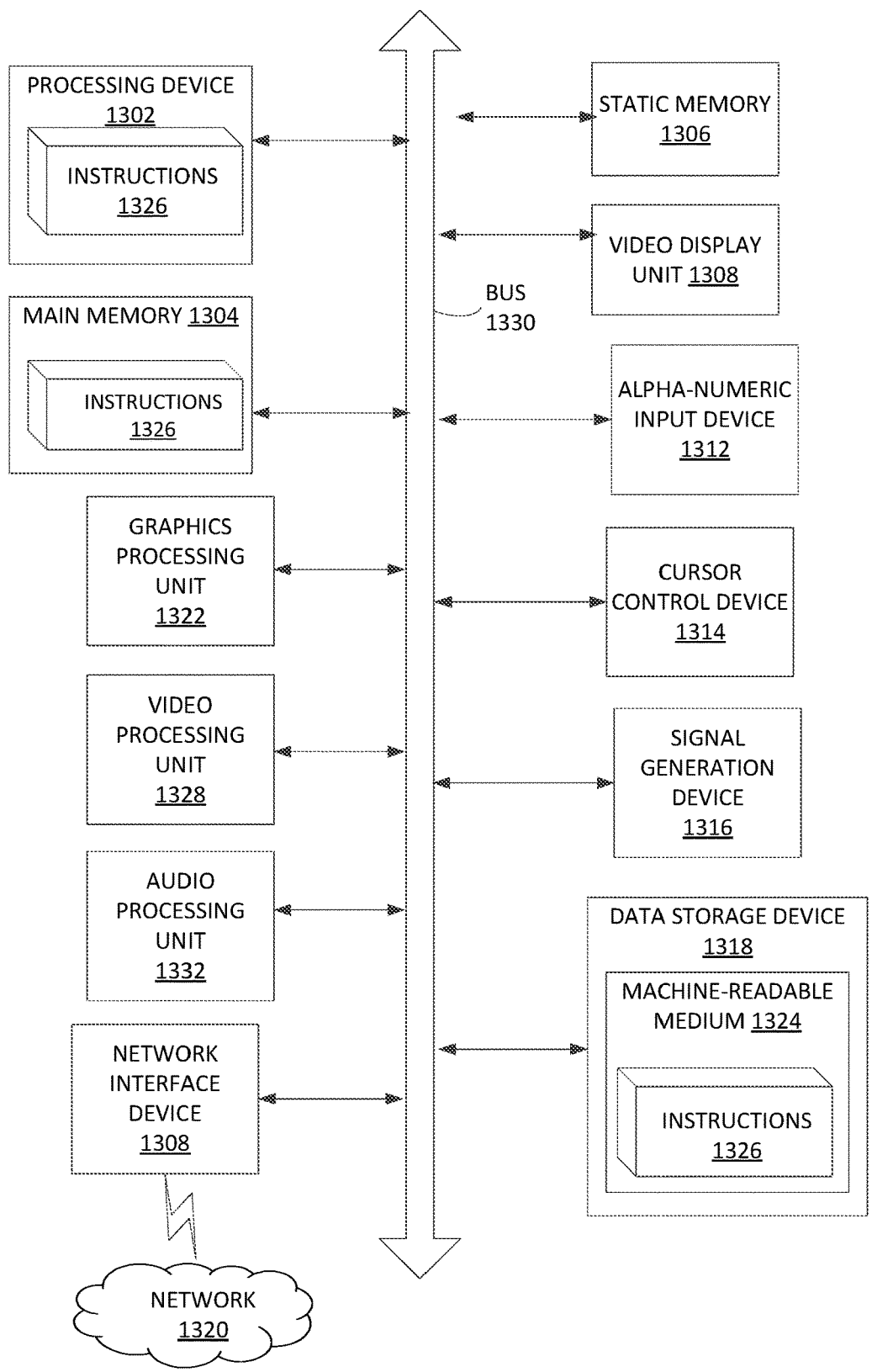
FIG. 13 illustrates another implementation of a block diagram for a computing system.

FIG. 13 illustrates a diagrammatic representation of a machine in the example form of a computing system 1300 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the converting pages and sections can be implemented in computing system 1300.

The computing system 1300 includes a processing device 1302, main memory 1304 (e.g., read-only memory (ROM), flash memory, dynamic random access memory (DRAM) (such as synchronous DRAM (SDRAM) or DRAM (RDRAM), etc.), a static memory 1306 (e.g., flash memory, static random access memory (SRAM), etc.), and a data storage device 1318, which communicate with each other via a bus 1330.

Processing device 1302 represents one or more general-purpose processing devices such as a microprocessing device, central processing unit, or the like. More particularly, the processing device may be complex instruction set computing (CISC) microprocessing device, reduced instruction set computer (RISC) microprocessing device, very long instruction word (VLIW) microprocessing device, or processing device implementing other instruction sets, or processing devices implementing a combination of instruction sets. Processing device 1302 may also be one or more special-purpose processing devices such as an application specific integrated circuit (ASIC), a field programmable gate array (FPGA), a digital signal processing device (DSP), network processing device, or the like. In one implementation, processing device 1302 may include one or more processing device cores. The processing device 1302 is configured to execute the processing logic 1326 for performing the operations discussed herein. In one implementation, processing device 1302 can be part of the computing system 100 of FIG. 1. Alternatively, the computing system 1300 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1300 may further include a network interface device 1308 communicably coupled to a network 1320. The computing system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), a signal generation device 1316 (e.g., a speaker), or other peripheral devices. Furthermore, computing system 1300 may include a graphics processing unit 1322, a video processing unit 1328 and an audio processing unit 1332. In another implementation, the computing system 1300 may include a chipset (not illustrated), which refers to a group of integrated circuits, or chips, that are designed to work with the processing device 1302 and controls communications between the processing device 1302 and external devices. For example, the chipset may be a set of chips on a motherboard that links the processing device 1302 to very high-speed devices, such as main memory 1304 and graphic controllers, as well as linking the processing device 1302 to lower-speed peripheral buses of peripherals, such as USB, PCI or ISA buses.

The data storage device 1318 may include a computer-readable storage medium 1324 on which is stored software 1326 embodying any one or more of the methodologies of functions described herein. The software 1326 may also reside, completely or at least partially, within the main memory 1304 as instructions 1326 and/or within the processing device 1302 as processing logic 1326 during execution thereof by the computing system 1300; the main memory 1304 and the processing device 1302 also constituting computer-readable storage media.

The computer-readable storage medium 1324 may also be used to store instructions 1326 utilizing the processing device 1302, such as described with respect to FIGS. 1A and 1B, and/or a software library containing methods that call the above applications. While the computer-readable storage medium 1324 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the implementations. The term "computer-readable storage medium" shall accordingly be taken to include, but not be limited to, solid-state memories, and optical and magnetic media.

The following examples pertain to further embodiments.

Example 1 is a processing device comprising: 1) a translation lookaside buffer and 2) a processing core to execute a virtual machine monitor (VMM), the VMM to manage a virtual machine (VM) comprising one or more virtual processors, the processing core to: a) execute, via the VM, a plurality of conversion instructions on at least one of the one or more virtual processors to convert a plurality of non-secure pages to a plurality of secure pages; and b) execute, via the VM, one or more allocation instructions on the at least one of the one or more virtual processors to allocate at least one secure page of the plurality of secure pages, execution of the one or more allocation instructions to include determining whether the TLB is cleared of mappings to the at least one secure page prior to allocating the at least one secure page.

In Example 2, in the processing device of Example 1, the VM is to perform the page conversions without tracking by the VMM.

In Example 3, in the processing device of any of Examples 1-2, the VMM is to manage a guest epoch for the VM, wherein the guest epoch comprises a value indicative of a time period during which mappings are made to the plurality of secure pages in the TLB.

In Example 4, in the processing device of any of Examples 1-3, a beginning of the guest epoch is marked by an initial execution of a first conversion instruction of the plurality of conversion instructions and an end of the guest epoch is marked by an initial attempt by any of the one or more virtual processors to execute the one or more allocation instruction on the at least one secure page converted in that guest epoch.

In Example 5, the processing device of any of Examples 1-4, is further to deliver, via the VM, a VM exit responsive to a positive determination that: a) a current value of the guest epoch matches a stored value of the guest epoch associated with the at least one secure page during which the at least one secure page was converted; or b) the VMM is currently clearing the TLB for the guest epoch with the current value.

In Example 6, in the processing device of any of Examples 1-5, the VMM is to, responsive to the VM exit: a) increment the current value of the guest epoch and set a tracking in progress (TIP) bit to indicate that the VMM is currently clearing the TLB for the guest epoch with the current value; b) clear the TLB of mappings to the at least one secure page; and c) clear the TIP bit to indicate that the TLB is cleared of the mappings.

In Example 7, the processing device of any of examples 1-6, is further to allocate, via the VM, the at least one secure page responsive to a negative determination that: a) a current value of the guest epoch matches a value of the guest epoch associated with the at least one secure page during which the at least one secure page was converted; or b) the VMM is currently clearing the TLB for the guest epoch with the current value.

In Example 8, the processing device of any of Examples 1-7, is further to, in response to a positive determination that the current value of the guest epoch matches a stored value of the guest epoch associated with the at least one secure page when the at least one secure page was converted: a) increment, via the VM, a current value of the guest epoch; b) set, via the VM, a tracking in progress (TIP) bit; and c) perform, via the VM, a VM exit, wherein the VMM is instructed to handle the VM exit by clearing the TLB of mappings to the at least one secure page and clearing the TIP bit to indicate that the TLB is cleared of the mappings.

In Example 9, in the processing device of any of Examples 1-8, is further to, in response to a positive determination that the VMM is currently clearing the TLB for the guest epoch with a current value: perform, via the VM, a VM exit, wherein the VMM is instructed to handle the VM exit by resuming the VM.

In Example 10, in the processing device of any of Examples 1-9, a performance of the processing device is improved due to the VM delivering a single VM exit that corresponds to a collection of the plurality of secure pages when one of the one more allocation instructions is attempted.

In Example 11, in the processing device of any of Examples 1-10, a performance of the processing device is improved due to the VMM clearing the TLB a single time when one of the one or more allocation instructions, corresponding to the at least one secure page, is attempted.

Various embodiments may have different combinations of the structural features described above. For instance, all optional features of the computing system described above may also be implemented with respect to the method or process described herein and specifics in the examples may be used anywhere in one or more embodiments.

In Example 12, a method comprising: 1) executing, via a VM comprising one or more virtual processors, a plurality of conversion instructions on at least one of the one or more virtual processors to convert a plurality of non-secure pages to a plurality of secure pages, wherein the VM is managed by a virtual machine monitor (VMM) executing on a processing core; and 2) executing, via the VM, one or more allocation instructions on the at least one of the one or more virtual processors to allocate at least one secure page of the plurality of secure pages, execution of the one or more allocation instructions to include determining whether a translation lookaside buffer (TLB) is cleared of any mappings to the at least one secure page prior to allocating the at least one secure page.

In Example 13, the method of Example 12 further comprising, 1) delivering, via the VM, a VM exit responsive to a positive determination that: a) a current value of a guest epoch matches a stored value of the guest epoch associated with the at least one secure page during which the at least one secure page was converted, wherein the guest epoch indicates a time period during which mappings are made to the plurality of secure pages in the TLB; or b) the VMM is currently clearing the TLB for the guest epoch with the current value.

In Example 14, in the method of any of Examples 12-13, the VMM handles the VM exit, responsive to a determination that the current value of the guest epoch matches the stored value of the guest epoch associated with the at least one secure page and a tracking in progress bit is clear, by: a) incrementing the current value of the guest epoch and setting a tracking in progress (TIP) bit to indicate that the TLB is currently being cleared for the guest epoch with the current value; b) clearing the TLBs of mappings to the at least one secure page; c) clearing the TIP bit to indicate that the TLB is clear of the mappings; and d) resuming the VM to finish executing the one or more allocation instructions for the at least one secure page.

In Example 15, in the method of any of Examples 12-14, the VMM handles the VM exit, responsive to a determination that the stored value of the guest epoch associated with the at least one secure page is one less than the current value of the guest epoch and a tracking in progress bit is set, by: a) waiting until the TLB is cleared of the mappings for the guest epoch with the current value; or b) resuming the VM to retry executing the one or more allocation instructions for the at least one secure page.

In Example 16, in the method of any of Examples 12-15, the VMM manages a guest epoch for the VM, wherein the guest epoch comprises a value indicative of a time period during which mappings are made to the plurality of secure pages in the TLB, wherein a beginning of the guest epoch is marked by an initial execution of a first conversion instruction of the one or more conversion instructions and an end of the guest epoch is marked by an initial attempt by any of the one or more virtual processors to execute the one or more allocation instruction on the at least one secure page converted in that guest epoch.

In Example 17, the method of any of Examples 12-16 further comprising storing a current value of a guest epoch in a secure metadata location associated with each of the plurality of secure pages during which the VM executes each of the plurality of conversion instructions, wherein the guest epoch indicates a time period during which mappings to the plurality of secure pages are made in the TLB.

Various embodiments may have different combinations of the structural features described above. For instance, all optional features of the processing devices and methods described above may also be implemented with respect to a system described herein and specifics in the examples may be used anywhere in one or more embodiments.

Example 18 is a system comprising: 1) a memory device to store instructions; and 2) a processing device operably coupled to the memory device, the processing device comprising a translation lookaside buffer (TLB) and the processing device to execute the instructions to: a) allocate, via a virtual machine monitor (VMM), a data structure for a virtual machine (VM), wherein the data structure comprises a guest epoch for the VM and a tracking in progress (TIP) bit, the guest epoch comprising a current value indicative of a time period during which mappings are made by the VM to an unallocated secure page in the TLB, and the guest epoch is associated with the unallocated secure page by a guest operating system (OS) of the VM upon conversion of the unallocated secure page from non-secure to secure; b) receive execution control of the VM via a VM exit; c) responsive to a determination that the guest epoch associated with the secure page matches the current value of the guest epoch in the data structure and the TIP bit is clear: i) increment the current value of the guest epoch in the data structure; ii) set the TIP bit; and iii) clear the TLB of any mappings to the unallocated secure page.

In Example 19, in the system of Example 18, a beginning of the guest epoch is marked by an initial execution of a first conversion instruction of a plurality of conversion instructions executed by the VM and an end of the guest epoch is marked by an initial attempt by the VM to execute an allocation instruction on the unallocated secure page converted in that guest epoch.

In Example 20, in the system of any of Examples 18-19, the processing device is further to: i) clear the TIP bit after the TLB is cleared; and ii) resume the VM, wherein, responsive to resuming, the VM to execute an allocation instruction to allocate the unallocated secure page.

In Example 21, in the system of any of Examples 18-20, the VM is to perform page conversions without tracking by the VMM.

In Example 22, in the system of any of Examples 18-21, the data structure comprises 64 bits, and wherein the 64 bits comprise bits 62:0 that contain the guest epoch and bit 63 that contains the TIP bit.

In Example 23, in the system of any of Examples 18-22, the processing device is further to set a VM-execution control on each of the virtual processors of the VM, and wherein the VM-execution control causes the virtual processors to deliver the VM exit during execution of an allocation instruction in response to a determination, by the VM, that the guest epoch associated with the secure page matches the current value of the guest epoch in the data structure, or in response to a determination that the TIP bit is set and the guest epoch associated with the secure page is one less than the current value of the guest epoch in the data structure.

Various embodiments may have different combinations of the operational features described above. For instance, all optional features of the method described above may also be implemented with respect to an integrated circuit. Specifics in the examples may be used anywhere in one or more embodiments.

Example 24 is an integrated circuit comprising: 1) a memory device to store instructions; 2) a processing core operably coupled to the memory device, the processing core to execute the instructions to execute a virtual machine monitor (VMM), the VMM to manage a virtual machine (VM) comprising one or more virtual processors, wherein the processing core further to: a) execute, via the VM, a plurality of conversion instructions on at least one of the one or more virtual processors to convert a plurality of non-secure pages to a plurality of secure pages; and b) execute, via the VM, one or more allocation instructions on the at least one of the one or more virtual processors to allocate at least one secure page of the plurality of secure pages, execution of the one or more allocation instructions to include determining whether a translation lookaside buffer (TLB) is cleared of mappings to the at least one secure page prior to allocating the at least one secure page.

In Example 25, in the integrated circuit of Example 24, the VM is to perform page conversions without tracking by the VMM.

In Example 26, in the integrated circuit of any of Examples 24-25, the VMM is to manage a guest epoch for the VM, wherein the guest epoch comprises a value indicative of a time period during which mappings are made to the plurality of secure pages in the TLB.

In Example 27, in the integrated circuit of any of Examples 24-26, a beginning of the guest epoch is marked by an initial execution of a first conversion instruction of the plurality of conversion instructions and an end of the guest epoch is marked by an initial attempt by any of the one or more virtual processors to execute the one or more allocation instruction on the at least one secure page converted in that guest epoch.

In Example 28, in the integrated circuit of any of Examples 24-27, the processing core is further to deliver, via the VM, a VM exit responsive to a positive determination that: a) a current value of the guest epoch matches a stored value of the guest epoch associated with the at least one secure page during which the at least one secure page was converted; or b) the VMM is currently clearing the TLB for the guest epoch with the current value.

Various embodiments may have different combinations of the structural features described above. For instance, all optional features of the computing system described above may also be implemented with respect a system for tracking and managing a translation lookaside buffer (TLB) described herein and specifics in the examples may be used anywhere in one or more embodiments.

Example 29 is a system for tracking and managing a translation lookaside buffer (TLB), the system comprising: 1) a memory device to store instructions; 2) a processing core operably coupled to the memory device, the processing core to execute the instructions to execute a virtual machine monitor (VMM), the VMM to manage a virtual machine (VM) comprising one or more virtual processors, wherein the processing core further to: a) execute, via the VM, a plurality of conversion instructions on at least one of the one or more virtual processors to convert a plurality of non-secure pages to a plurality of secure pages; and b) execute, via the VM, one or more allocation instructions on at least one of the one or more virtual processors to allocate at least one secure page of the plurality of secure pages, execution of the one or more allocation instructions to include determining whether the translation lookaside buffer (TLB) is cleared of mappings to the at least one secure page prior to allocating the at least one secure page.

In Example 30, the system for tracking and managing a TLB of Example 29, further comprising the subject matter of Examples 2-11.

In Example 31, in the system for tracking and managing a TLB of Example 29, the processing core is further operable to perform subject matter of Examples 13-17.

Various embodiments may have different combinations of the operational features described above. For instance, all optional features of the method described above may also be implemented with respect to an apparatus. Specifics in the examples may be used anywhere in one or more embodiments.

Example 32 is an apparatus for tracking and managing a translation lookaside buffer (TLB), comprising: 1) means for executing a virtual machine monitor (VMM), the VMM to manage a virtual machine (VM) comprising one or more virtual processors; 2) means for executing, via the VM, a plurality of conversion instructions on at least one of the one or more virtual processors to convert a plurality of non-secure pages to a plurality of secure pages; and 3) means for executing, via the VM, one or more allocation instructions on at least one of the one or more virtual processors to allocate at least one secure page of the plurality of secure pages, execution of the one or more allocation instructions to include determining whether a translation lookaside buffer (TLB) is cleared of mappings to the at least one secure page prior to allocating the at least one secure page.

In Example 33, the apparatus of Example 32, further comprising the subject matter of any of Examples 1-11 and 24-28.

Various embodiments may have different combinations of the operational features described above. For instance, all optional features of the method described above may also be implemented with respect to another apparatus. Specifics in the examples may be used anywhere in one or more embodiments.

Example 34 is an apparatus comprising 1) a memory; and 2) a processing device coupled to the memory, wherein the processing device is to perform the method of any of Examples 12-18.

In Example 35, the apparatus of Example 34, further comprising the subject matter of any of Examples 1-11 and 24-31.

Various embodiments may have different combinations of the operational features described above. For instance, all optional features of the method described above may also be implemented with respect to a non-transitory, computer-readable storage medium. Specifics in the examples may be used anywhere in one or more embodiments.

Example 36 is a non-transitory machine-readable storage medium including instructions that, when executed by a processing device, cause the processing device to: 1) execute, via a VM comprising one or more virtual processors, a plurality of conversion instructions on at least one of the one or more virtual processors to convert a plurality of non-secure pages to a plurality of secure pages, wherein the VM is managed by a virtual machine monitor (VMM) executing on a processing core; and 2) execute, via the VM, one or more allocation instructions on the at least one of the one or more virtual processors to allocate at least one secure page of the plurality of secure pages, execution of the one or more allocation instructions to include determining whether a translation lookaside buffer (TLB) is cleared of mappings to the at least one secure page prior to allocating the at least one secure page.

In Example 37, in the non-transitory machine-readable storage medium of Example 36, the processing device is further to perform the method of any of Examples 13-17.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processing devices and system configurations, specific hardware structures, specific architectural and micro architectural details, specific register configurations, specific instruction types, specific system components, specific measurements/heights, specific processing device pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processing device architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to TLB tracking and managing in specific integrated circuits, such as in computing platforms or microprocessing devices. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processing device (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processing device, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processing device or machine that performs data manipulations. However, the present disclosure is not limited to processing devices or machines that perform 512 bit, 256 bit, 128 bit, 64 bit, 32 bit, or 16 bit data operations and can be applied to any processing device and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processing device that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EE- PROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processing device comprising:
   a translation lookaside buffer (TLB);
   a processing core to execute a virtual machine monitor (VMM), the VMM to manage a virtual machine (VM) comprising a plurality of virtual processors, the processing core to:
   execute, via the VM, a plurality of conversion instructions on the plurality of virtual processors to convert a plurality of non-secure pages to a plurality of secure pages, wherein a first value of a guest epoch is stored in a field of a secure area of memory for each of the plurality of non-secure pages prior to an initial execution of a first conversion instruction of the plurality of conversion instructions, wherein the first value of the guest epoch indicates a first period of time during which mappings to the plurality of non-secure pages are allowed, and wherein a beginning of a second period of time associated with a second value of the guest epoch is marked by the initial execution of the first conversion instruction;
   responsive to converting the plurality of non-secure pages to the plurality of secure pages, store the second value of the guest epoch in the field of the secure area of the memory for each of the plurality of secure pages, wherein the second value of the guest epoch indicates the second period of time during which new mappings to the plurality of secure pages are blocked until clearing of the TLB; and
   execute, via the VM, one or more allocation instructions on at least one of the plurality of virtual processors to allocate at least one secure page of the plurality of secure pages, execution of the one or more allocation instructions to include determining the second value of the guest epoch is stored in the field for the at least one secure page and determining the TLB is cleared of mappings to the at least one secure page prior to allocating the at least one secure page, wherein an end of the second period of time associated with the second value of the guest epoch is marked by an initial attempt by any of the plurality of virtual processors to execute a first allocation instruction of the one or more allocation instructions on the at least one secure page converted during the second period of time.

2. The processing device of claim 1, wherein the VM is to perform the converting of the plurality of non-secure pages to the plurality of secure pages without tracking by the VMM, wherein tracking by the VMM comprises mapping which of the plurality of non-secure pages are converted to the plurality of secure pages in a page table.

3. The processing device of claim 1, wherein:
the VMM is to manage the guest epoch for the VM;
first threads running during the first period of time corresponding to the first value of the guest epoch have one or more mappings to one or more of the plurality of non-secure pages in the TLB;
second threads running in the second period of time corresponding to the second value of the guest epoch are blocked from mapping to the plurality of secure pages until allocation of the plurality of the secure pages; and
the first threads and the second threads correspond to the plurality of virtual processors.

4. The processing device of claim 3, wherein the processing core is further to deliver, via the VM, a VM exit responsive to a positive determination that:
a current value of the guest epoch matches a value of the guest epoch for the at least one secure page during which the at least one secure page was converted; or
the VMM is currently clearing the TLB for the guest epoch with the current value.

5. The processing device of claim 4, wherein the VMM is to, responsive to the VM exit:
increment the current value of the guest epoch and set a tracking in progress (TIP) bit to indicate that the VMM is currently clearing the TLB for the guest epoch with the current value;
clear the TLB of mappings to the at least one secure page; and
clear the TIP bit to indicate that the TLB is cleared of the mappings.

6. The processing device of claim 3, wherein the processing core is further to allocate, via the VM, the at least one secure page responsive to a negative determination that:
a current value of the guest epoch matches a value of the guest epoch stored for the at least one secure page during which the at least one secure page was converted; or
the VMM is currently clearing the TLB for the guest epoch with the current value.

7. The processing device of claim 3, wherein the processing core is further to, in response to a positive determination that a current value of the guest epoch matches a value of the guest epoch stored for the at least one secure page during which the at least one secure page was converted:
increment, via the VM, the current value of the guest epoch;
set, via the VM, a tracking in progress (TIP) bit; and
perform, via the VM, a VM exit, wherein the VMM is instructed to handle the VM exit by clearing the TLB of mappings to the at least one secure page and clearing the TIP bit to indicate that the TLB is cleared of the mappings.

8. The processing device of claim 3, wherein the processing core is further to, in response to a positive determination that the VMM is currently clearing the TLB for the guest epoch with a current value:
perform, via the VM, a VM exit, wherein the VMM is instructed to handle the VM exit by resuming the VM.

9. The processing device of claim 1, wherein the VM delivers a single VM exit that corresponds to a collection of the plurality of secure pages during which one of the one or more allocation instructions is attempted.

10. The processing device of claim 1, wherein the VMM clears the TLB a single time during which one of the one or more allocation instructions, corresponding to the at least one secure page, is attempted.

11. A method comprising:
executing, via a VM comprising a plurality of virtual processors, a plurality of conversion instructions on the plurality of virtual processors to convert a plurality of non-secure pages to a plurality of secure pages, wherein the VM is managed by a virtual machine monitor (VMM) executing on a processing core, wherein a first value of a guest epoch is stored in a field of a secure area of memory for each of the plurality of non-secure pages prior to an initial execution of a first conversion instruction of the plurality of conversion instructions, wherein the first value of the guest epoch indicates a first period of time during which mappings to the plurality of non-secure pages are allowed, and wherein a beginning of a second period of time associated with a second value of the guest epoch is marked by the initial execution of the first conversion instruction;
responsive to converting the plurality of non-secure pages to the plurality of secure pages, store the second value of the guest epoch in the field of the secure area of the memory for each of the plurality of secure pages, wherein the second value of the guest epoch indicates the second period of time during which new mappings to the plurality of secure pages are blocked until clearing of a translation lookaside buffer (TLB); and
executing, via the VM, one or more allocation instructions on at least one of the plurality of virtual processors to allocate at least one secure page of the plurality of secure pages, execution of the one or more allocation instructions to include determining the second value of the guest epoch is stored in the field for the at least one secure page and determining the TLB is cleared of any mappings to the at least one secure page prior to allocating the at least one secure page, wherein an end of the second period of time associated with the second value of the guest epoch is marked by an initial attempt by any of the plurality of virtual processors to execute a first allocation instruction of the one or more allocation instructions on the at least one secure page converted during the second period of time.

12. The method of claim 11, further comprising delivering, via the VM, a VM exit responsive to a positive determination that:
a current value of the guest epoch matches a value of the guest epoch stored for the at least one secure page during which the at least one secure page was converted; or
the VMM is currently clearing the TLB for the guest epoch with the current value.

13. The method of claim 12, wherein the VMM handles the VM exit, responsive to a determination that the current value of the guest epoch matches the value of the guest epoch stored for the at least one secure page and a tracking in progress (TIP) bit is clear, by:
   incrementing the current value of the guest epoch and setting the TIP bit to indicate that the TLB is currently being cleared for the guest epoch with the current value;
   clearing the TLB of mappings to the at least one secure page;
   clearing the TIP bit to indicate that the TLB is clear of the mappings; and
   resuming the VM to finish executing the one or more allocation instructions for the at least one secure page.

14. The method of claim 12, wherein the VMM handles the VM exit, responsive to a determination that the value of the guest epoch stored for the at least one secure page is one less than the current value of the guest epoch and a tracking in progress (TIP) bit is set, by:
   waiting until the TLB is cleared of the mappings for the guest epoch with the current value; or
   resuming the VM to retry executing the one or more allocation instructions for the at least one secure page.

15. The method of claim 11, wherein:
   the VMM manages the guest epoch for the VM; and
   first threads running during the first period of time corresponding to the first value of the guest epoch have one or more mappings to one or more of the plurality of non-secure pages in the TLB.

16. The method of claim 11, further comprising storing a current value of the guest epoch in a secure metadata location associated with each of the plurality of secure pages during which the VM executes each of the plurality of conversion instructions.

17. A system comprising:
   a memory device to store instructions; and
   a processing device operably coupled to the memory device, the processing device comprising a translation lookaside buffer (TLB) and the processing device to execute the instructions to:
      allocate, via a virtual machine monitor (VMM), a data structure for a virtual machine (VM), wherein:
         the VM is to execute a plurality of conversion instructions on a plurality of virtual processors of the VM to convert a plurality of non-secure pages to a plurality of secure pages;
         the data structure comprises a guest epoch for the VM and a tracking in progress (TIP) bite;
         a first value of the guest epoch is indicative of a first time period during which mappings are made by the VM to a non-secure page in the TLB and the first value of the guest epoch is stored in a secure area of memory for the non-secure page by a guest operating system (OS) of the VM prior to an initial execution of a first conversion instruction of the plurality of conversion instructions;
         a beginning of a second period of time associated with a second value of the guest epoch is marked by the initial execution of the first conversion instruction;
         the second value of the guest epoch is indicative of a second time period during which new mappings to an unallocated secure page in the TLB by the VM are blocked until clearing of the TLB and the second value is stored in the secure area of the memory for the unallocated secure page by the guest OS of the VM responsive to conversion of the unallocated secure page from non-secure to secure; and
         an end of the second period of time associated with the second value of the guest epoch is marked by an initial attempt by any of the plurality of virtual processors to execute a first allocation instruction on at least one secure page converted during the second period of time;
      receive execution control of the VM via a VM exit;
      responsive to a determination that a value of the guest epoch stored for the unallocated secure page matches a current value of the guest epoch in the data structure and the TIP bit is clear:
         increment the current value of the guest epoch in the data structure;
         set the TIP bit; and
         clear the TLB of any mappings to the unallocated secure page.

18. The system of claim 17, wherein the processing device is further to:
   clear the TIP bit after the TLB is cleared; and
   resume the VM, wherein, responsive to resuming, the VM is to execute an allocation instruction to allocate the unallocated secure page.

19. The system of claim 17, wherein the VM is to perform converting of the plurality of non-secure pages to the plurality of secure pages without tracking by the VMM, and wherein tracking by the VMM comprises mapping which of the plurality of non-secure pages are converted to the plurality of secure pages in a page table.

20. The system of claim 17, wherein the data structure comprises 64 bits, and wherein the 64 bits comprise bits 62:0 that contain the guest epoch and bit 63 that contains the TIP bit.

21. The system of claim 17, wherein the processing device is further to set a VM-execution control on each virtual processor of the plurality of virtual processors of the VM, and wherein the VM-execution control causes the plurality of virtual processors to deliver the VM exit during execution of an allocation instruction in response to a determination, by the VM, that the value of the guest epoch stored for the unallocated secure page matches the current value of the guest epoch in the data structure, or in response to a determination that the TIP bit is set and the value of the guest epoch stored for the unallocated secure page is one less than the current value of the guest epoch in the data structure.

22. The system of claim 17, wherein:
   the VM is to execute one or more allocation instructions on at least one of the plurality of virtual processors to allocate the at least one secure page of the plurality of secure pages; and
   execution of the one or more allocation instructions is to include determining the second value of the guest epoch is stored in the secure area for the at least one secure page and determining the TLB is cleared of mappings to the at least one secure page prior to allocating the at least one secure page.

* * * * *